Aug. 8, 1967  L. KLEIST ETAL  3,334,539
CAMERA CODER
Filed May 18, 1964  8 Sheets-Sheet 4

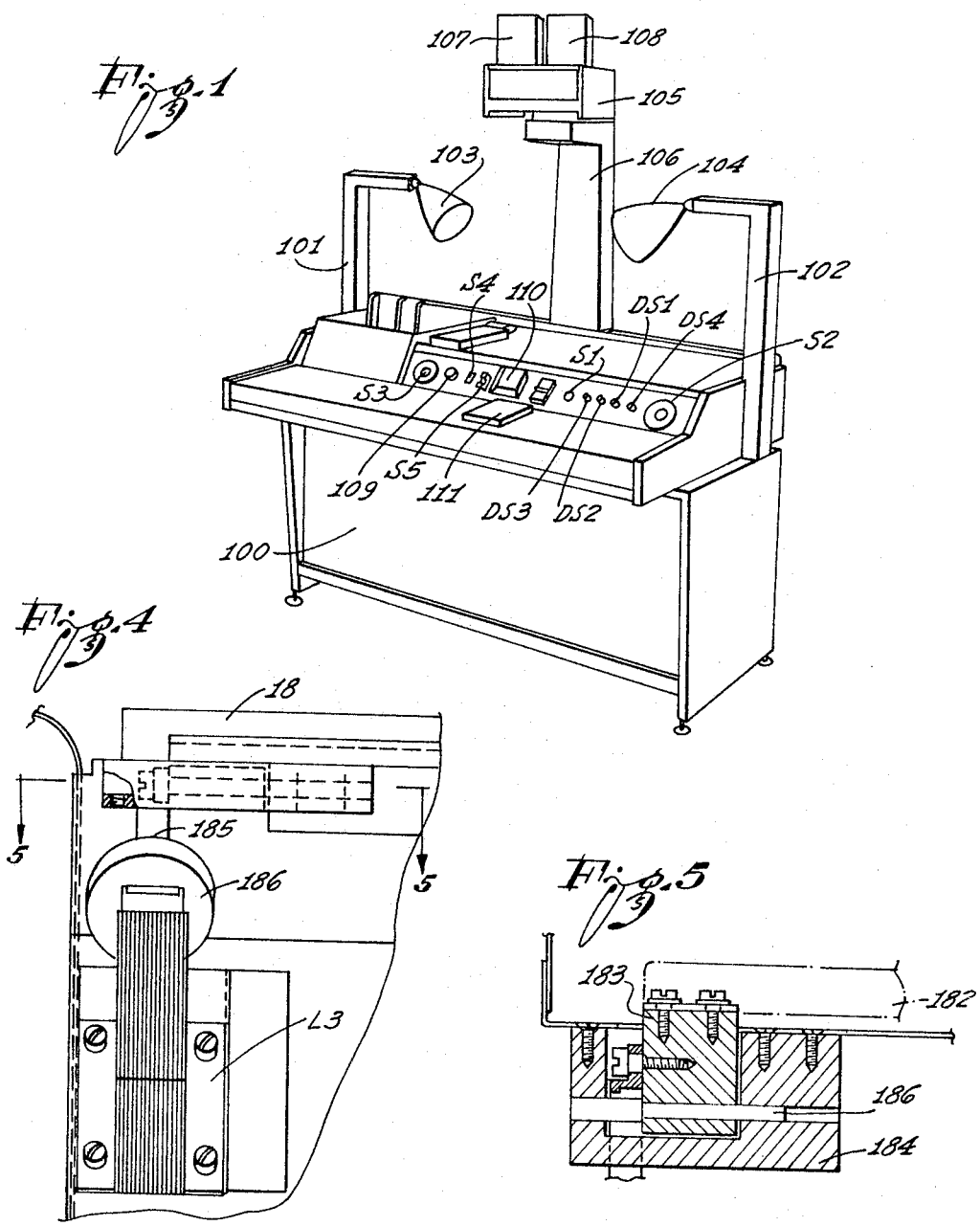

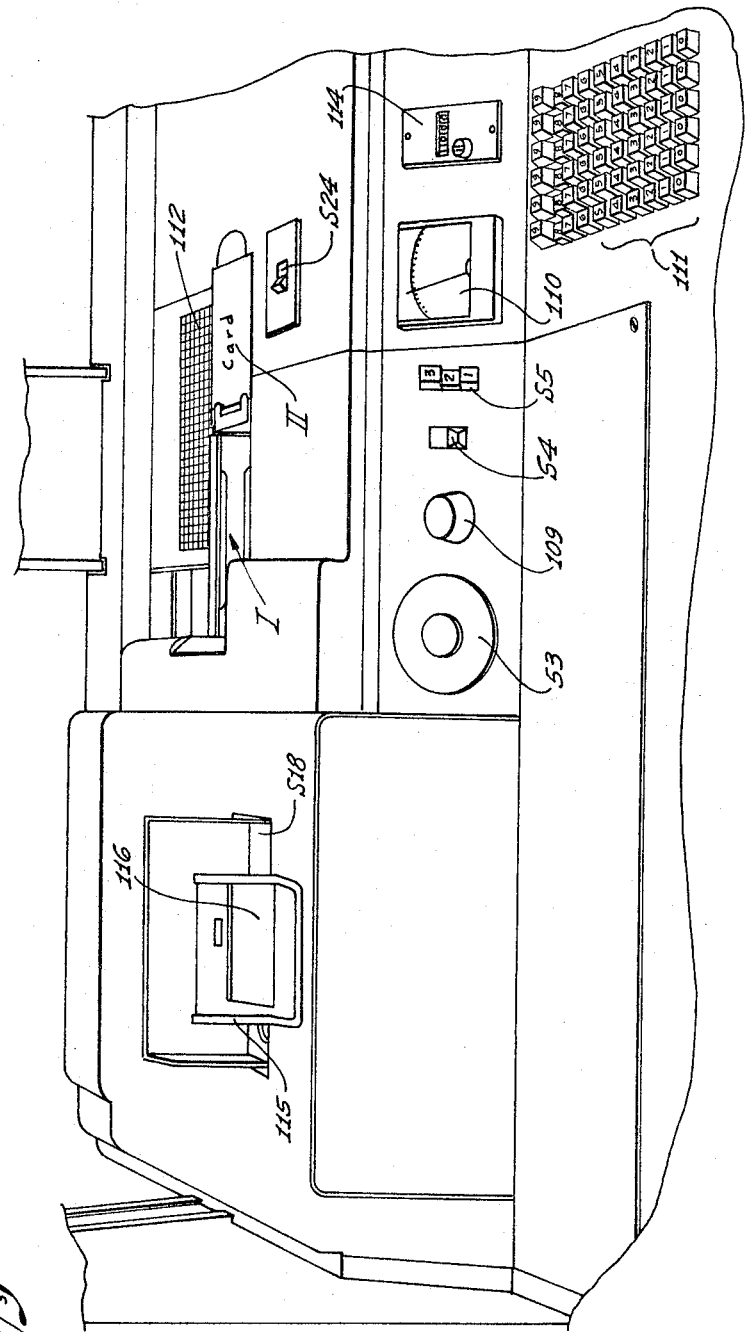

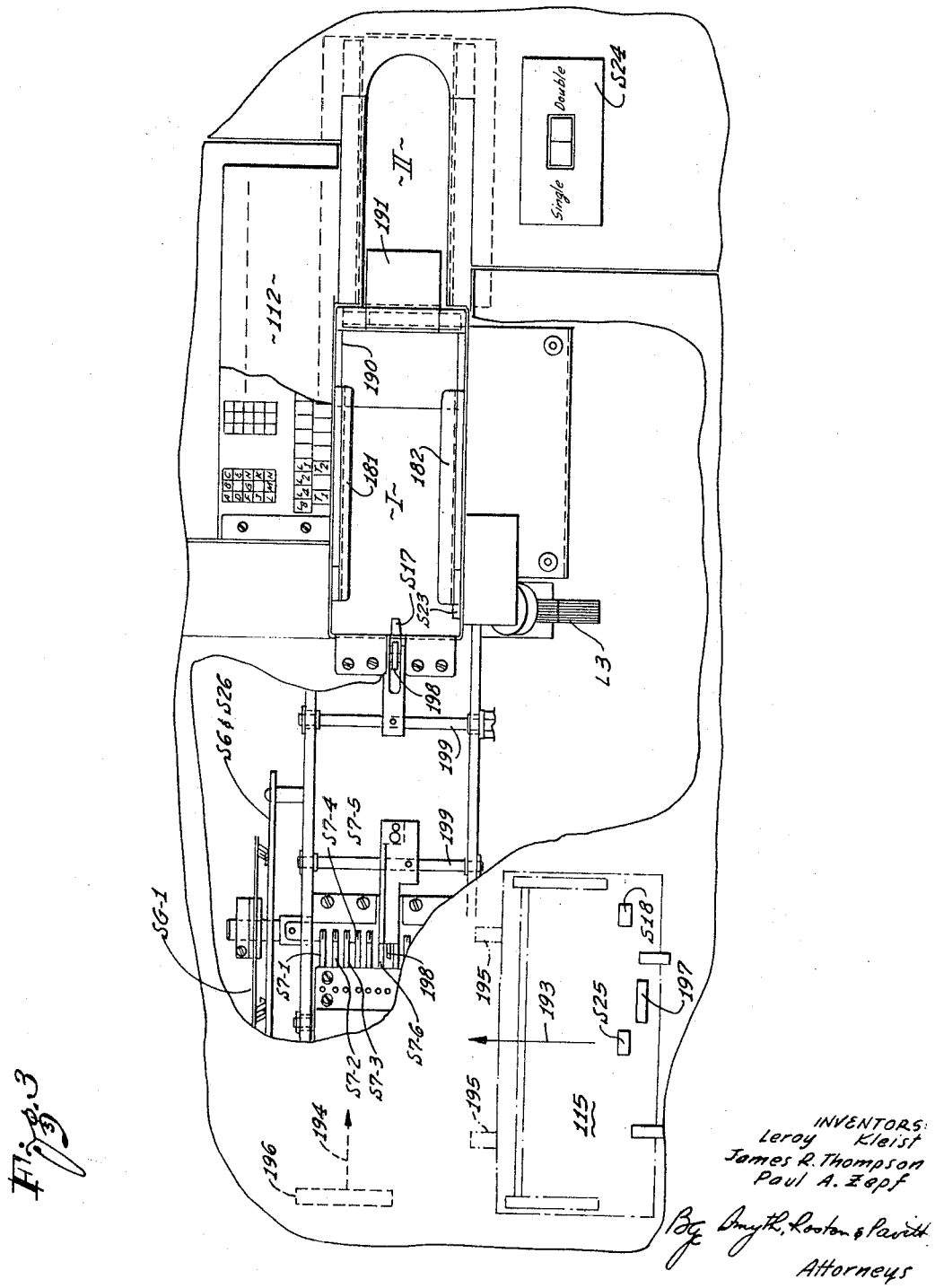

INVENTORS:
Leroy Kleist
James R. Thompson
Paul A. Zepf

By Smyth, Roston & Pavitt
Attorneys

Aug. 8, 1967  L. KLEIST ETAL  3,334,539
CAMERA CODER

Filed May 18, 1964  8 Sheets-Sheet 5

INVENTORS:
Leroy Kleist
James R. Thompson
Paul A. Zepf

By Smyth, Roston & Pavitt
Attorneys

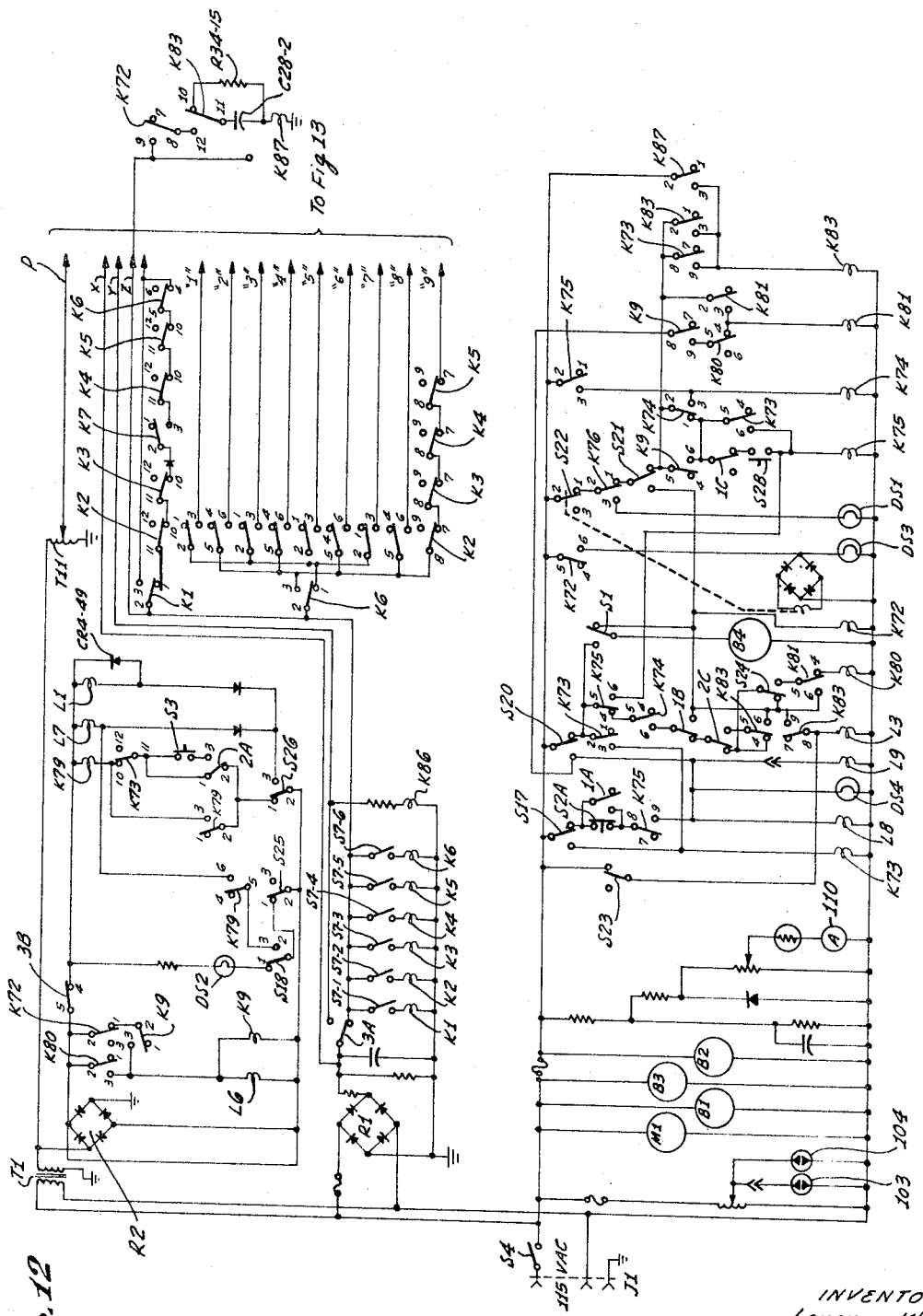

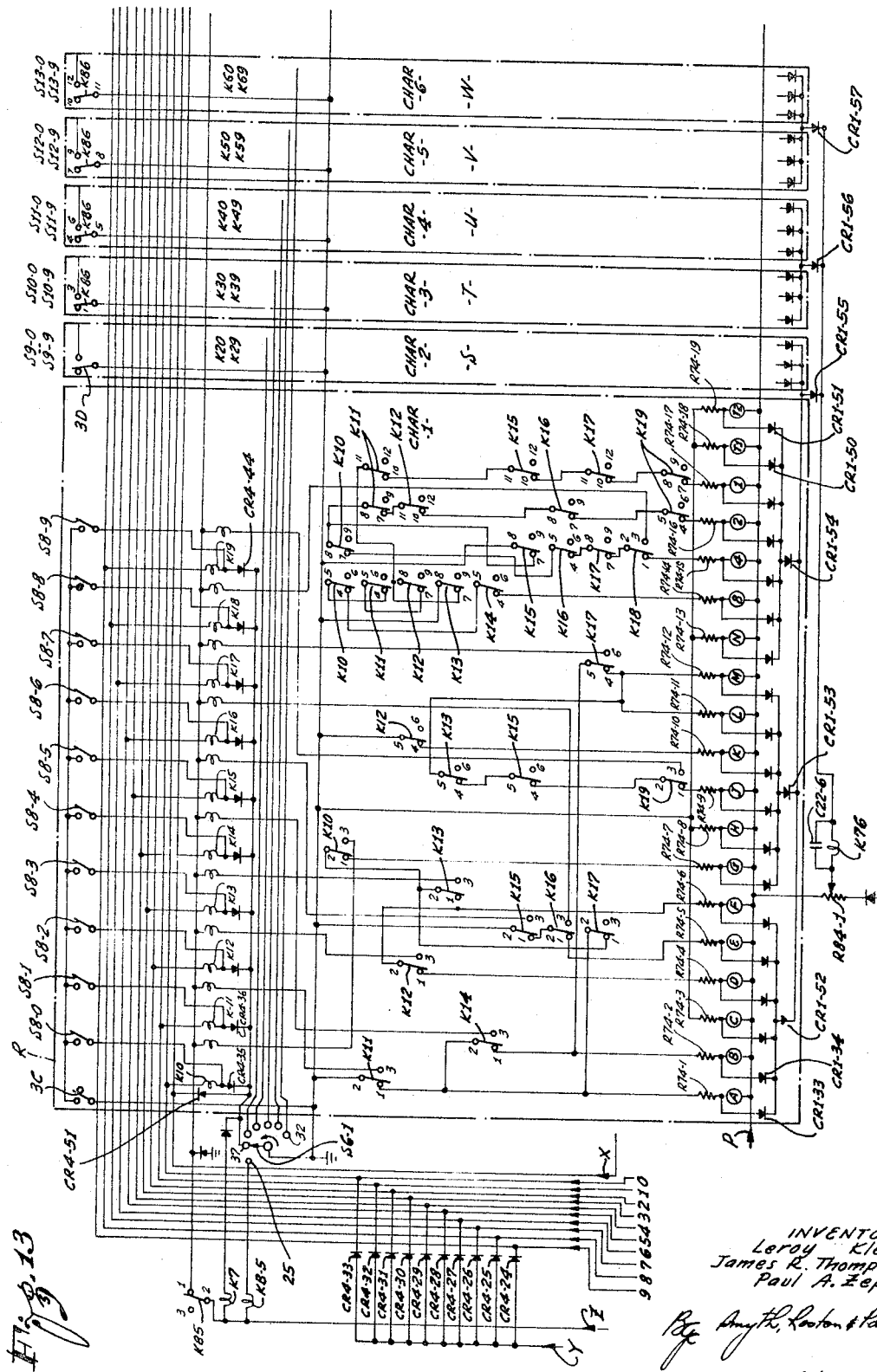

Aug. 8, 1967  L. KLEIST ET AL  3,334,539
CAMERA CODER
Filed May 18, 1964                               8 Sheets-Sheet 8

Fig. 14

| Character | Card Row | | | | | |
|---|---|---|---|---|---|---|
| | 1 | 2 | 3 | 4 | 5 | 6 |
| 0 | x | | | | | |
| 1 | | x | | | | |
| 2 | | x | | | | x |
| 3 | | | x | | | |
| 4 | | | x | | | x |
| 5 | | | | x | | |
| 6 | | | | x | | x |
| 7 | | | | | x | |
| 8 | | | | | x | x |
| 9 | | | | | | x |

Fig. 15

Character Segment Code

| Lamp Character | A | B | C | D | E | F | G | H | J | K | L | M | N | $L_8$ | $L_4$ | $L_2$ | $L_1$ |
|---|---|---|---|---|---|---|---|---|---|---|---|---|---|---|---|---|---|
| 9 | L | L | L | L | L | L | L | 0 | L | L | L | L | L | L | 0 | 0 | |
| 8 | L | L | L | L | L | L | L | L | L | L | L | L | 0 | L | L | | |
| 7 | L | L | L | 0 | L | 0 | 0 | L | 0 | L | 0 | 0 | L | L | 0 | L | 0 |
| 6 | L | L | L | L | 0 | L | L | L | L | L | L | L | L | 0 | 0 | L | |
| 5 | L | L | L | L | 0 | L | L | 0 | L | L | L | L | L | 0 | 0 | 0 | |
| 4 | L | 0 | L | L | L | L | L | 0 | L | 0 | 0 | L | 0 | L | L | L | |
| 3 | L | L | L | 0 | L | 0 | L | L | 0 | L | L | L | 0 | L | L | 0 | |
| 2 | L | L | L | 0 | L | L | L | L | 0 | L | L | L | 0 | L | 0 | L | |
| 1 | 0 | 0 | L | 0 | L | 0 | 0 | L | 0 | L | 0 | 0 | L | 0 | L | 0 | 0 |
| 0 | L | L | L | L | L | L | 0 | L | L | L | L | L | 0 | 0 | L | L | |

Code Display Arrangement

| A | B | C |
|---|---|---|
| D | | E |
| F | G | H |
| J | | K |
| L | M | N |

| 8 | 4 | 2 | 1 |
|---|---|---|---|

| Time #1 | Time #2 |
|---|---|

Time Lamps are ON at all Times

INVENTORS:
Leroy Kleist
James R. Thompson
Paul A. Zepf

By Smyth, Roston & Panitch
Attorneys

United States Patent Office 3,334,539
Patented Aug. 8, 1967

3,334,539
CAMERA CODER
Leroy Kleist, Ogden, and James R. Thompson and Paul A. Zepf, Champaign, Ill., assignors to The Magnavox Company, Fort Wayne, Ind., a corporation of Delaware
Filed May 18, 1964, Ser. No. 368,169
22 Claims. (Cl. 88—24)

The present invention relates to an apparatus for providing a continuous record of a plurality of individual documents. More particularly, the present invention relates to an apparatus for copying on a film or the like a number of encoded, such as punched, cards.

It is a specific object of the present invention to provide an apparatus in which, for example, punched cards of the usual size are being copied, for example, by photographing, whereby the copying process permits a substantial reduction in size of the record area. Accordingly, it is an object of the present invention to provide a new system to reduce the amount of material necessary for storing the information available in punched cards.

Punched cards are of standard size and a certain amount of information requires a corresponding amount of such cards. The drastic increase of information to be handled everywhere requires accordingly very large amounts of such cards and the storage space for such cards is correspondingly large. By copying, for example, photographing the cards on film, a substantial reduction in size as to the storage area for the same amount of information is attained without foregoing the character of the stored material. The situation with regard to information storage space is even more difficult if the punched cards merely serve for code identification and if the information proper is contained in other documents. It is, therefore, another object of the present invention to provide a continuous copy record of cards together with associated documents and permitting the photographing of relatively enlarged identifying codes alongside such cards and documents.

According to one aspect of the present invention in a preferred embodiment thereof, the following apparatus is being suggested. For example, cards such as punched cards or other individual documents are being stored in a container or the like permitting the individual dispensing of cards, one at a time, and permitting transport thereof through a code reading station. The code reading station scans the document; for example, the code reader comprises a set of contact fingers each scanning a row on a punched card, and all of the contact fingers together concurrently scan the same column or a portion thereof. The card then passes on into a document or a camera bed where it comes to a stop. In the meantime, the code read from specific columns of the card by means of the contact fingers is being decoded and re-encoded to provide for a plurality of signals. In particular, there is provided near the camera bed an illuminating display area comprised of, for example, sets of lamps. The lamps of each set are arranged in a pattern which is capable of legibly displaying a decimal digit, in that specific lamps are on and others are off, and the lamps in on-state outline the contour of a digit. The decoded signals are being re-encoded for permitting control of these sets of lamps set so that a particular number is being displayed by illumination. In addition, the same decimal number may be displayed by illuminating means as binary coded bits.

It is a specific feature of this invention that this illuminating display area is positioned very close to the camera bed. A photographic camera is now provided to photograph the camera bed with a card, together with the juxtaposed illuminating display. Since speed is of the essence, the photographic process in the camera is being triggered automatically at the moment the card is properly positioned in the camera bed and has stopped therein. The decoding and re-encoding of the identifying code read from a card is carried out instantaneously, or approximately instantaneously, when the card passes through the code reading area. The legible numbers will be displayed by the illuminating means when the card is not yet in the camera bed. Accordingly, the transfer system as between code reading and display by illumination stores the code signals so as to permit display long after the card has left the reading station. Photographing of the card and display can be had immediately upon proper positioning of the card. After completion of the photographing, the card is being automatically dropped into an output hopper and the film in the camera is being advanced.

It should be mentioned that the photographic process for making a permanent record of a punched card or of any other document, together with its displayed identifying code, is only the most advantageous method of copying and recording, and it is within the realm of possibility to provide other facsimile ways of making a permanent record (photocopying, electrostatic, etc.).

Further features of the invention relate to the provision of means enabling the apparatus to run in different modes. In the most advanced state, the photographing of cards is being carried out fully automatically. Cards from a stack of cards are being fed intermittently and sequentially through the reading station and then to the photographic bed and to the output hopper until all of the cards have been photographed. A semi-automatic mode requires manual exposure control for the taking of each individual picture so that not only cards but other documents which may accompany the cards or may be associated therewith can be photographed. These additional documents are being photographed together with the particular identifying code number still being displayed.

Manual mode of operation requires manual exposure control for any document as well as manual control of card feeding. Additionally, the manual mode requires manual setting of identifying codes to be displaced in the display area.

Means may be provided in the camera which change the specific field of vision as observed by the camera so that, for example, the two sides of a document can be photographed successively whereby the image of these two sides is juxtaposed to the image of the same code as displayed.

Further features of the invention include provisions for blocking the photographing of a punched card whenever there is an an error in the additional display or when there is no longer any film available or when the film has not advanced properly after the last picture has been taken.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

FIGURE 1 illustrates a perspective view of an apparatus which constitutes the preferred embodiment of the present invention;

FIGURE 2 illustrates in perspective view an enlarged portion of the apparatus shown in FIGURE 1, particularly showing the front panel and the photographic bed in greater detail;

FIGURE 3 illustrates somewhat schematically a top view of the operating area of the apparatus shown in FIGURES 1 and 2 illustrating particularly the photographing area and the path of cards fed to the photographing area for processing;

FIGURE 4 illustrates somewhat schematically and in side view the output hopper control solenoid;

FIGURE 5 illustrates a sectional view with the section taken on plane S—S in FIGURE 4;

FIGURE 12 illustrates somewhat schematically the wiring diagram of the control circuit for the reading station, the card advance control, the decoding network, and the automatic photographic control;

FIGURE 13 illustrates somewhat schematically a wiring diagram of a re-encoding and a digital display device control;

FIGURE 14 illustrates schematically the code chart used and representing the function of the decoding network shown in FIGURE 12; and FIGURE 15 illustrates somewhat schematically the code chart of the re-encoding network shown in FIGURE 13.

*General description*

Figure 6:
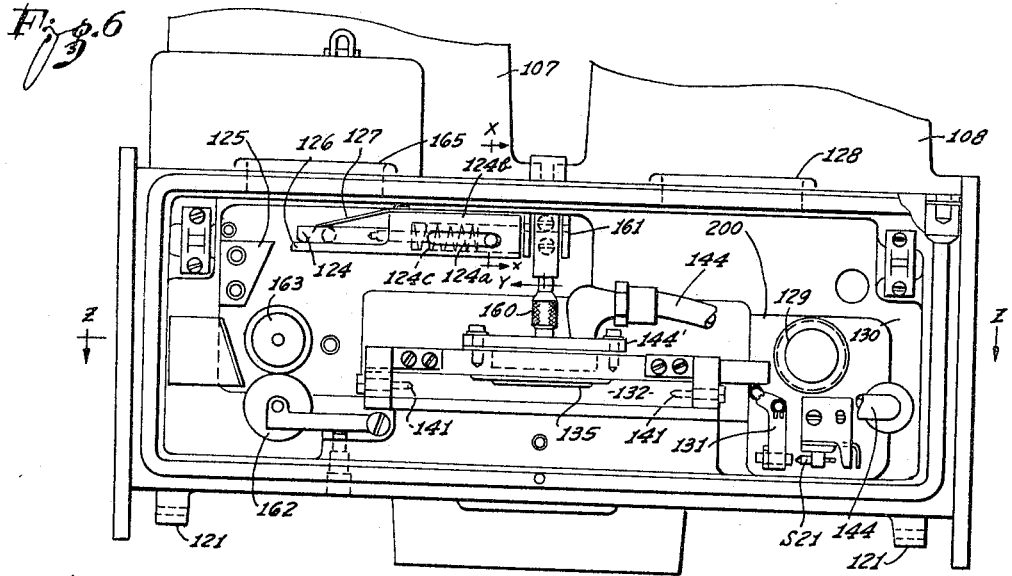
FIGURE 6 illustrates a front view of the camera with the front door thereof removed.

FIGURE 1 illustrates in perspective top view the general layout of the camera coder in accordance with the present invention. There is provided a housing 100 serving as the general support. Two L-shaped lamp support arms 101 and 102 are attached to housing 100 and they universally support photographic lamps 103 and 104, respectively, for illuminating the documents to be photographed. A camera head 105 is centrally supported by a rearwardly disposed camera head beam 106 and above the operating surface of the housing. The camera head 105 supports two film magazine casings 107 and 108.

As can be seen best from FIGURE 2, there is provided a front panel which includes the main power switch S4 and a light intensity control knob 109 for controlling the intensity of the light used for photographing. The adjusted amount of light available is indicated by a meter 110. A switch S3 is provided for manually controlling the feeding of a single card from a storage area into the range of the camera. A keyboard 111 includes altogether sixty buttons for manually controlling the decimal number legibly displayed in a code area 112.

For purposes of this code display there are provided six sets of thirteen lamps each. Each such sets of lamps are arranged to form an "8." By turning selected lamps on and others off, it is possible to legibly display the ten decimal numbers. For example, in case an "8" is to be displayed, all of the lamps of one set are on. If a "0" is to be displayed, the center lamp will be turned off while all of the others are on, etc. The lamps in display area 112 can also be controlled automatically by reading of a code on a card when it is being transported into the camera range. This will be described more fully below.

Beneath each set of thirteen lamps there is provided another set of four lamps for purposes of indicating and displaying in binary code the decimal number legibly displayed thereabove. Beneath the code area 112 there are provided a document area I and a document area II. Documents to be photographed must be positioned in one of these document areas.

Reference numeral 115 designates an input hopper into which is placed a pile of punched cards to be fed in sequence into the document area I. At the bottom of hopper 115 there is provided a switch S18 which is activated whenever there is at least one card still in the hopper, but the switch S18 shifts into the deactivated state whenever the hopper 115 is empty. The hopper 115 includes a weight 116 placed on top of a pile of cards so as to provide sufficient pressure upon these cards. Also, such pressure insures that the empty hopper switch S18 is activated whenever there is a card in the hopper 115. Beneath document area I there is an output hopper with a tray 190, which is removable. The tray receives the cards after they have been photographed.

The front panel further includes a mode switch S5 having three punch buttons S5-1 for mode 1, S5-2 for mode 2 and S5-3 for mode 3. The camera coder can thus be operated in three modes: automatic (mode 1), semiautomatic (mode 2) and manual (mode 3). During the automatic mode, cards are continuously and sequentially fed from input hopper 115, photographed, and passed into output hopper 190. No manual operation is required until either exposable film runs out or there are no more cards available. (Other error situations will be described below.) Semi-automatic operation permits also automatic and sequential photography of cards, but the cards in hopper 115 have to be fed through manual control into the camera range (see switch S3 infra) and photographing of additional documents requires also manual exposure control.

Additionally, this semi-automatic mode permits the photographing of additional documents but together with display of the same code which was read previously from a punched card. Mode 3 operation requires manual operation of card placement, code display and exposure control, but photographing and film transport themselves are in any event carried out atuomatically after manual initiation thereof.

There is next provided document switch S24 capable of assuming two positions, one being the "single" position, the other being the "double" position. The meaning of this switch designation will be explained more fully below. However, it can be mentioned at this point that the purpose of this switch S24 is to govern the photographing of additional cards or documents associated with a punched card whereby "single" or "double" means the photographing of one or of both sides of such accompanying cards and documents.

Proceeding now with the description of the panel, there is next provided a counter 114 designed to count the number of frames on the unexposed film payout reel still available for exposure. A switch S1 serves for manually advancing the film prior to any photographing operation and during the threading in of the film. Also, this switch S1 serves to govern the complete unreeling of the film from the payout reel after completion of photographing. The switch S2 serves to manually control exposure either during a complete manual mode of operation or during the semi-automatic mode when additional documents are being photographed.

There are provided four indicator lamps DS1 through DS4. The lamp DS1 indicates whether there is an error in the display of the legible decimal numbers or the binary codes thereof. Such error may arise when the readout code from a punched card is not properly being reproduced in the code area 112. Also, such error may arise when the number selected by the keyboard 111 is not being properly reproduced in the code area 112. Indicator lamp DS2 lights up whenever the hopper for the cards to be fed through the reading and display area is empty. Indicator lamp DS3 serves to indicate completion of film advancing and proper counter operation. Lamp DS4 will light up during an exposure of film by the camera head.

*Card operating area*

In the following it shall be described briefly how a card is being transported from the input hopper 115 and how such card is being processed until it drops into an output hopper 190. Reference is made specifically to FIGURE 3. Cards are individually transported from the input hopper 115 in two phases: First, a card is being moved from the hopper 115 in the direction of arrow 193 whereby a card feed solenoid (not shown, see L1 in FIGURE 12) initiates the movement of a ram 197 and of rollers 195. This phase of card movement is called "card feed cycle" and it places a card into the "pre-read position." Secondly, and subsequently, the same card is being passed from the pre-read position in the direction of arrow 194 through a code reading station containing contact fingers S7-1 through S7-6. Each of these six contact fingers scan one row of a punch card. The contact fingers are arranged to concurrently read six rows of one column. This phase of card movement is called the "read cycle."

During the read cycle a card is being moved first by a ram 196 and then by pinch rollers 198 and torque rollers 199. Rollers 198 and 199 and ram 196 are cam operated, and they are being driven from a continuously running motor (not shown) drivingly coupled to a roller and run by a clutch which is controlled by another solenoid (not shown here, but see L7 in FIGURE 12). The mechanical arrangment is mentioned only for purposes of completion and for orientation and does not constitute a part of this invention. It will be described more fully with reference to FIGURE 12 how these two solenoids are being energized and it is of importance only that there are controllable means for transporting a card. The transporting itself can be had in any convenient and known manner. It is material that the specific mechanical movements are being controlled and governed by these two solenoids. It is apparent to one skilled in the art that suitable mechanical means may be provided to move first the card in one direction and to subsequently move the card in another direction. For purposes of the present invention it is of importance only that each card is being moved in two steps and that during the second step such card is being transported past the reading station which contains these contact fingers S7-1 through S7-6.

As further shown in FIGURE 3, a switch disk S6-S26 is provided to run concurrently with the passage columns on a card under fingers S7-1 to S7-6. A scanning arm S6-1 sequentially engages contact segments on this switch disk and the resulting contact with individual contact segments is representative of the particular column as momentarily monitored by the scanning fingers. It might be convenient to employ interconnected segments so that a particular contact relation is present during the passage of several columns through the reading station.

The card when moving through the reading station and direction of arrow 194 soon enters what is called the document area I. This is a portion of the range of the photographic camera. The entrance of this document area I is governed by a switch S17 which is being actuated as soon as the leading edge of a card enters this document area I; switch S17 will be deactivated as soon as the card is placed in proper position in document area I.

To the right of document area I there is provided a document area II into which a card is not being fed automatically but which serves as photographing area for documents other than punched cards. The purpose of this document area II will be described more fully below but it is apparent that document area II is placed side by side with document area I and has approximately the same outline. Above document areas I and II there is provided a display area. The display area 112 is constituted by altogether six sets of lamps. Each set of lamps first comprises fourteen lamps A, B, C, D, E, F, G, H, J, K, L, M and N. These thirteen lamps are arranged for legibly displaying figures as decimal numbers. In particular, when all thirteen lamps are turned on, they will display an "8." By turning off selected ones of these lamps, other numbers can be legibly displayed; for example, if a lamp G is being turned off, a "0" will be displayed. When lamps E and K are off, a "3" will be displayed, etc. FIGURE 15 illustrates the pattern of illumination to display the decimal numbers 0 through 9. L in FIGURE 15 means that a lamp is on. O indicates that it is off.

Beneath each set of thirteen lamps there are provided four lamps L1, L2, L4 and L8 for displaying the same number but in a binary code. Beneath these four lamps there are two timing lamps indicating the duration of lamp display.

Each set of thirteen plus four plus two lamps is individually controlled by control circuit units such as illustrated in circuit diagram in FIGURE 13 and to be described more fully below. It is of importance in the present invention that the display area 112, the document area I and the document area II are positioned to be photographed together. In particular, the punched card in document area I and the display area 112 always have to be photographed together by one photographing step. This photographing step will be described also more fully below.

The document area I actually constitutes also the top of an output hopper 190 into which a card can be dropped after completion of photographing.

Actually, when in photographing area I, the punched card will be seated on rails 181 and 182. These rails normally prevent the card from dropping into the hopper 190. However, rails 181 and 182 are separated from the hopper 190, and the hopper and rails are independently movable. In particular, the rails 181 and 182 can be pivoted about an axis which runs in the plane of the drawing of FIGURE 3 and perpendicular to the direction defined by arrow 194. Reference shall now be made specifically to FIGURES 4 and 5.

A rail 182 is secured to a block 183 which is pivotally mounted on a stationary support member 184. The block 183 is directly secured to a bar 185 and at an angle thereto. Bar 185 is integral with an armature 186 pertaining to a solenoid coil L3 in the following called card drop solenoid. Upon energization of solenoid L3, the rail 182 will pivot downward, just permitting the card to drop into the hopper below.

It will be appreciated that rail 181 is linked to a similar solenoid; and it will be further appreciated that, for completion of the dropping of the card, it is necessary that both such solenoids are being actuated in unison.

The output hopper 190 is constituted by a tray having a handle 191 for removing same. The handle projects into the document area II. Documents other than punched cards will be placed during a specific operational mode into this area to be photographed, together with the numbers which are being lit up in the document numbering display area.

*Camera head*

The camera head which is disposed on top of the beam 106 comprises primarily a casing upon which are placed the magazine 108 for the feed or payout reel and the magazine 107 for the takeup reel. The camera casing has a front door 120 which is downwardly pivotal about pivot pins received in lugs 121. A film cutter handle 122 projects outwardly from the front door 120. The handle 122 and particularly a pin 122a thereof are laterally movable in a slot 120a in the door 120. Pin 122a serves to move a sliding actuator 122b. When door 120 is closed, the actuator 122b, then inside of the camera casing, engages a pin 123 which is screwed laterally into a cutter shaft 124a for cutting cooperation with a stationary cutter block 125. The cutter shaft 124a slides in holder 124b, which is provided with a slot 124c, to guide the movement of the pin 123 and of the cutter 124 screwed to the shaft 124a. A spring 127 urges the knife portion of the cutter 124 towards a bed 126 projecting from holder 124b.

The film 200 when leaving the payout reel (not shown in magazine 108) passes through an upper aperture 128 of the camera housing. The film 200 runs over a guide roller 129 which is journaled by means of ball bearings upon an inner traverse 130 which is integral with the camera housing and constitutes a dividing wall. The film 200 runs over the guide roller 129 and into engagement with a roller 131, which is being supported at the end of an indexing arm 131a. The indexing arm 131a is pivotally mounted beneath the film.

This indexing arm 131a is the operating element of a film position switch S21, which switch operates in a circuit network to stop the film transport after actuation thereof. This film position switch is a vital element in the photographing control network, which will be described more fully below. At this point it is sufficient to state that the film indexing arm 131a is in its deactivated state whenever film is in a position permitting photographing. During advancing of the film by one frame, the movement of the film causes the arm 131a to pivot out of its resting position whereby switching operations are performed, to be described later and with reference to FIG. 12. After the film has advanced by one frame, the indexing arm is pivoted back into its normal or resting or unactivated position.

Figure 7:
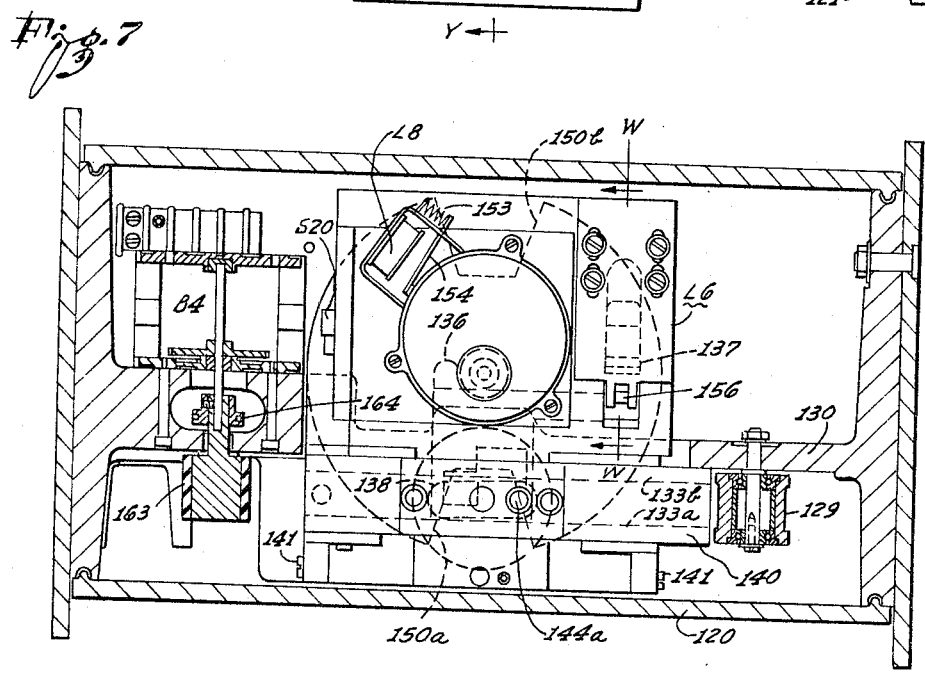
FIGURE 7 illustrates a sectional view taken from plane Z—Z in FIGURE 6.
Figure 7A:
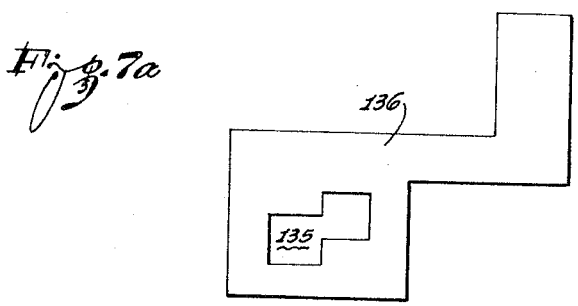
FIGURE 7a illustrates a frame outlined in dotted lines in FIGURE 7.

The film 200 then runs over a guide member 132 having a shallow groove defined by two lateral guide surfaces 133a and 133b. The guide member 132 defines a flat space 132a to receive a movable frame or mask 136. The shape of the mask is illustrated in FIG. 7a, and the respectively visible portions thereof are denoted by separate reference characters. The guide plate and particularly the groove therein have an aperture 138 which is symmetrically disposed to the optical axis of the photographic lens assembly 139. The lens assembly 139 is adjustably mounted in the lower portion of the camera casing, and there is a cavity 134 beneath the cover plate; the cavity is closed by film 200 across the aperture 138, and the glass of the lens assembly 139 closes the cavity from below. The cavity is further defined by walls 134a and 134b.

Figure 8:
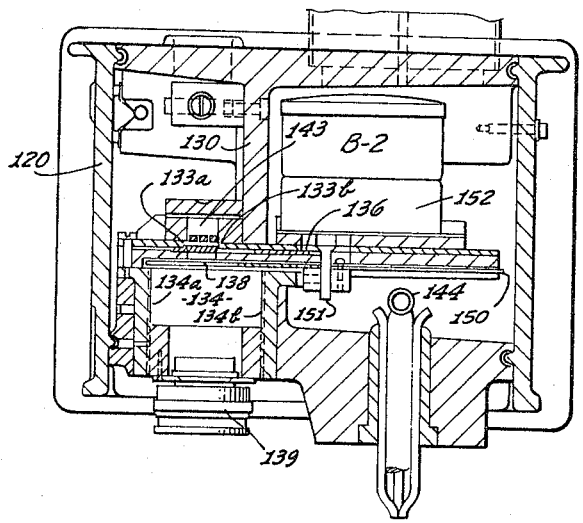
FIGURE 8 illustrates a sectional view through plane Y—Y identified in FIGURE 6.
Figure 9:
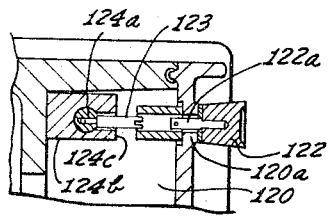
FIGURE 9 illustrates a sectional view taken through plane X—X identified in FIGURE 6.
Figure 10:
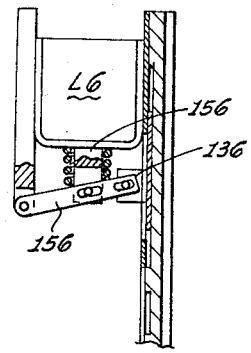
FIGURE 10 illustrates a sectional view through a portion of the camera taken in the plane W—W identified in FIGURE 7.

A platen 140 is pivotally mounted, and there are pivot pins 141 to pivot the platen from a position in which its lower face engages the upper part of member 132 into the dashed position shown in FIG. 8. The platen 140 defines a vacuum chamber 143 into which run a vacuum hose 144 suitably connected to a vacuum pump driven by a vacuum pumping motor B1 (not shown in FIG. 8—see FIG. 12), there being an aperture 144a in platen 140. The lower part of the platen is provided with a plurality of ducts. An adjustable fastener 160 is provided to engage an indentation in the upper part of platen 140. The fastener 160 can be pivoted about a pivot pin structure 161, to be moved out of the way in case the platen is being pivoted into its alternative position. In the illustrated position, fastener 160 urges the platen against the film bed and supporting structure 132 to insure that a vacuum can be established in chamber 143. Whenever the chamber 143 is being evacuated, the film is urged against the lower portion of platen 140 due to the communication provided through the ducts.

The supporting structure 132 furthermore provides for a flat space contiguous with chamber 134, in which is rotating the shutter disk 150, mounted on a shaft 151 and connectible to a continuously running shutter motor B2. A solenoid L8 serves to provide a selective connection of motor B2 through a clutch 152 to the driving shaft 151 of the shutter disk 150. There is provided an armature 154 biased by a spring 153 to control clutch 152. The clutch may include a built-in brake so that the shutter disk 150 is very accurately moved in between definite positions.

The shutter disk 150 has two apertures 150a and 150b which are diametrically opposed so that rotation by 180 degrees defines one photographic step. A sensing switch S20 is provided to sense passage of the shutter segments and apertures 150a and 150b. The shutter disk 150 is actually shown in the position it has when precisely halfway through shutter operation. The two cutouts 150a and 150b are normally positioned 90 degrees in relation to the illustrated position. The switch S20 is thus offset from the axis about which the shutter rotates as well as from the optical axis. Switch S20 drops into the cutout in the normal or resting position of the shutter disk, whereas the disk body lifts switch S20 into the activated position during rotation of the disk and particularly during exposure. The switch S20 is thus being actuated whenever the shutter starts to run, and it is being deactivated after completion of one shutter operation. The electrical function of this shutter position switch S20 will also be described more fully below. The respective position of the mask 136 and particularly of the frame aperture 135 therein, in relation to the stationary aperture 138 and the optical axis of the lens assembly 139 as well as to the film when in the film bed, is governed by a solenoid L6 which is spring biased and moves a lever arm 156 to thereby move a bracket member 137 on mask 136. The mask 136 follows this movement and in a plane parallel to the film.

Figure 11:
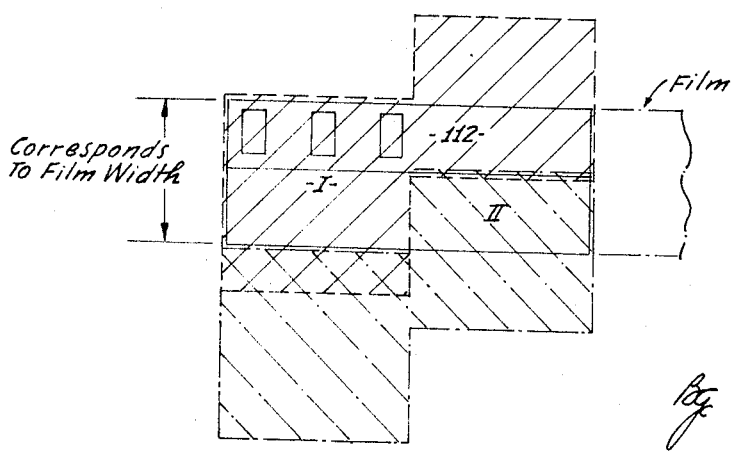
FIGURE 11 illustrates somewhat schematically the relationship between the image of the photographic area as shown in FIGURE 3 in relation to the frame aperture of the frame shown in FIGURE 7a, the frame being shown in two different positions.

The particular configuration of the frame opening 135 can be justified best with reference to FIG. 11. This figure illustrates schematically the document areas I and II and the display board, and there is superimposed the congruent outline of frame opening 135 in two of its alternative positions, thereby showing which portion of the combined photographic areas will be photographed. FIG. 11 can alternatively be interpreted as showing the document areas projected by the lens assembly into the film plane (see dashed and dotted lines). The dash-dot line thus shows that the entire photographic area will be covered without film movement by moving the mask from one position to the other and making an exposure for each mask position. This is necessary if, for the same display numbers, a card is to be photographed on both sides. The card is first placed with one side up in area I, and then it is turned over manually and placed with its other side up into area II; both sides appear with the same heading from the display area. Since the film is not being moved in between these two exposures, the particular configuration of the frame aperture 135 insures that no double exposure occurs.

The film 200, when leaving the film bed as defined by the groove having walls 133a and 133b, runs over a spring biased guide roller 162 which is mounted on a rocker arm 162a and cooperates with a drive roller 163 driven by a film advance motor B4. The motor shaft 155 further supports a pulley 156 partially enveloped by a belt 164. This belt drivingly interconnects motor B4 with the takeup reel (not shown) in magazine 107. The film 200 leaves the camera head through an aperture 165 to enter the magazine 107 which contains the take-up reel as stated. Upon leaving the drive roller 163, the film 200 traverses the area governed by the cutter assembly 124–125.

Film is being cut simply by moving handle 122 to the left, whereby cutter 124 in cooperation with cutter block 125 will cut the film whenever required.

The manual switches

The principal manual control elements have already been mentioned above and will be described briefly as far as their circuit connection is concerned to facilitate orientation in FIGS. 12 and 13. The mode switch S5 has three punch buttons, preferably of the locking type, with unlocking of one button upon actuation of another. The buttons are S5–1, S5–2, and S5–3. Mode switch S5–1 has switching blades 1A, 1B, and 1C. Mode switch S5–2 has switching blades 2A, 2B, and 2C; and mode switch S5–3 has switching blades 3A, 3B, and 3C. A manual exposure control switch has ganged blades S2A and S2B. The manual card feed control switch S3 and the manual film advance switch S1 each have one operating switching blade.

Card feeding control circuit

The circuit network, which is responsible for the transport of a punched card from a stack of punched cards situated in the input hopper 115 (FIGS. 1 and 2) to document area I, will be described below.

There is first provided a transformer T1 for reducing the operating voltage. A rectifier R2 is connected to the secondary winding of this transformer T1. This secondary winding as well as the rectifier each has one of its A.C. poles grounded. A capacitor C41–1 is connected across the positive and the negative D.C. output poles of the rectifier R2 and provides for filtering and smoothing action. Most of the circuit elements which are connected to the positive pole of the rectifier are governed by the mode switch 3B and, particularly, the contacts 4 and 5 thereof when interconnected. This part of the line governed by mode switch 3B is connected to one side of a card control relay K79, the escapement solenoid L7, and the card feed solenoid L1. The respective other sides of escapement solenoid L7 and card feed solenoid L1 are connected through rectifiers to a contact terminal 3 of an end-column switch S26 having its contact connected to the negative pole of the input power rectifier. The end-column switch S26 actually is a portion of switch S6–S26 shown in FIG. 3. This switch runs cyclically and completes a cycle concurrently to the feeding of a card through the read station. Switch S26 normally makes contact as is illustrated. Only when one or several of the last columns of a card pass through the read station (contact finger S7–1 to S7–6) does the switch S26 assume its alternative position.

The card feed solenoid L1 can be connected to the negative pole of the rectifier R2 only when switch S26 is activated and has its contacts 2 and 3 interconnected. Escapement coil L7 can be connected to the negative pole of the rectifier through interconnected contacts 5 and 6 of the energized relay K79 and through the activated hopper-empty switch S18, particularly the contacts 2 and 3 thereof. The hopper-empty switch S18 is activated whenever there are cards in the input hopper 115 (see FIG. 2). Contact 2 of the hopper-empty switch S18 is connected to a contact 1 of a cycle switch S25 having its contact 2 connected to the negative pole of the rectifier R2.

The card control relay K79 is connectible to the negative pole of the rectifier R2 in three different ways: A first current path is provided as a holding path through contacts 2 and 3 interconnected upon energization of relay K79. This connection is possible only if the end-column switch S26 has its contacts 1 and 2 interconnected, which is the normal position of switch S26. A second current path for relay K79 depends upon the de-energization of a master control relay of the photographic control network K73 (infra). The contacts 10 and 11 of this master control relay K73 are interconnected whenever this master control relay is de-energized, which is an indication that no automatic photographic cycle is being initiated. Wherever the contacts 10 and 11 of relay K73 are interconnected, an energizing path for relay K79 can be established through interconnection of contacts 1 and 2 by unactuated mode switch blade 2A, again provided that column switch S26 has its contacts 1 and 2 interconnected. The third energizing path for relay K75 is established again through the interconnected contacts 10 and 11 of the de-energized relay K73 and the depressed card feed switch S3, which is a manually operable switch. For card switch S3 to be effective, it is further necessary that the mode switch 2A be depressed, indicating that mode 2 operation is desired, whereby the contacts 2 and 3 thereof are being interconnected. Again, this interconnection requires interconnection of contacts 1 and 2 of column switch S26.

A rectifier Cr4–49 is connected across the card feed solenoid L1 in order to suppress arcing. The lamp DS2 is connected between the positive pole of the rectifier, on the one hand, and contact 1 of the hopper-empty switch S18, on the other hand. This lamp DS2 will be turned on whenever the input hopper is in fact empty.

Card transport is accomplished as follows. Initially, all cards are in the input hopper 115, and switch S18 is duly activated. When power is being applied to the system, the cycle switch will run and at a particular position, for a short duration; switch S26 will connect card feed solenoid L1 to the power, and a card will be advanced from the hopper (arrow 193 in FIG. 3) into a so-called pre-read position. During this card movement, switch S25 opens and remains open for the duration of the card transport. The card feed solenoid merely initiates the card feed cycle, and only this is of importance for the present invention. Once card feed solenoid L1 is energized, feeding of a card into the pre-read position is carried out automatically by rollers, etc.

As soon as end-column switch S26 returns to its normal state, relay K79 energizes through unactuated mode switch 2A interconnected contacts 10 and 11 of relay K73. Relay K79 holds over its own interconnected contacts 2–3 after energization for as long as end-column switch S26 is unactuated. Relay K79 interconnects its contacts 5 and 6, and as soon as a card is in pre-read position, switch S25 returns into the illustrated position; and now solenoid L7 energizes. This solenoid L7 controls movement of the card through the read station; i.e., under the contact fingers S7–1 to S7–6. During this passage of a card through the read station, relay K73 will energize via switch S17 (infra), thus temporarily blocking another initiation of energization of relay K79. However, this latter relay still holds over its own contacts. When the end of a card approaches the contact fingers S7–1 to S7–6, the column switch S26 responds and de-activates relay K79, but temporarily holds the solenoid L7 directly and initiates another feed cycle by connecting solenoid L1 to the power. As will be described more fully below, as soon as the first card coming from the read station reaches the photographic area, photographing will be initiated, which permits relay K73 to de-energize. This, in turn, permits the returning switch S26 to initiate another card read cycle, provided that the second card has reached the pre-read station and switch S25 opens. As soon as this happens, the second card runs through the read station, and the first card is dropped into output hopper 190. As soon as the end of the second card passes the read station, the cycle switch S26 actuates the solenoid L1 to have the third card pass into the pre-read position. During mode 2 operation, relay K79 can be energized only through the switch S3. Otherwise operation is as aforedescribed except that, upon return of switch S26 to its deactivated state, no new read cycle is initiated.

During mode 3 operation, the open contacts governed by blade 3B prohibit any response of either coil L1 or coil L7, and there will be no card transport.

It appears, therefore, that a card is being transported in that there is an alternation between the card read cycle and card feed cycle, but there is some overlapping. A card read cycle can be completed but not newly initiated during a card feed cycle because switch S25 prohibits response of relay K79 during the feed cycle. A card feed cycle can be initiated during the end portion of the card read cycle as determined by end-column switch S26.

Code reading and display device

In the following it shall be described how the code of the card passing through the card reading area is being read out, transformed into a decimal signal, and legibly displayed by way of a set of lamps (see lamps A to N in FIGURE 3). Such sets of lamps are positioned in the display area 112 which is close to the two document areas I and II to be photographed together with any document in either one or both of the document areas.

In FIGURE 12 there is first provided a rectifier network R1 establishing a low voltage DC potential whereby the negative pole of the rectifier is grounded and the positive pole is selectively fed to one of the lines X, Y and Z. Line X always receives positive potential. Since the line X is permanently energized, it serves to apply biasing potential to the various display stages for purposes of arc suppression. There is provided a diode CR4–51 to suppress any arc in case stage R is operating for code display of the first column read out from a card then in the card reading state. This will be described more fully below.

Line Y receives positive potential only in case switch S5 is set for mode 3 (manual) operation. Line Z receives positive potential from rectifier R1 during mode 1 and mode 2 operation in which the S5 mode 3 switch is not set. Line Z is deactivated when for mode 3 operation blade 3A reverses its position.

The card reading stage comprises the reading head which includes the six feeler switches denoted with reference characters S7–1, S7–2, S7–3, S7–4, S7–5 and S7–6, and already mentioned above. These switches are contact fingers respectively sensing, for example, first, second, third, fourth, fifth and sixth rows of a punched card passing through the reading area. These six switches or contact fingers S7–1 to S7–6 individually govern the application of the positive potential in line Z to the coils of relays K1, K2, K3, K4, K5 and K6, respectively. These relays will in the following be called translator relays.

The translator relay K1 governs a single blade to selectively interconnect contacts 2 and 1 or contacts 2 and 3. Upon interconnection of contacts 2 and 3 the positive potential of line Z is applied to a line "0". Looking at the code chart (FIGURE 14) it can be seen that decimal character "0" is encoded by a punched hole in the first card row with no holes in any of the five other rows. The code employed is a special weighted code of the 0–1–3–5–7—1 or 9 type.

The operating contacts of the other relays K2, K3, K4, K5 and K6 are interconnected in a manner to energize line "1," "2," "3," "4," "5," "6," "7," "8" and "9" for a specific code pattern outlined in the code chart of FIGURE 14. Each decimal character is decoded in connecting the positive potential of line Z to the respective line denoted with reference numeral which corresponds to the decimal number it represents.

In the following, the display control stage or unit R in FIGURE 13 will be described. This unit governs illumination of one set of lamps in the display area to legibly display one digit-decimal and the corresponding binary-decimal code.

There are provided in unit R ten display control relays denoted K10, K11, etc., through K19, and being respectively connected to lines "0" through "9". Accordingly, one relay is associated with each decimal number as decoded. These relays individually determine which ones from a set of lamps have to be turned off to legibly display the particular digit.

These relays are individually connected in series with diodes CR4–35 through CR4–44 having their respective cathodes connected to a terminal 37 pertaining to a column switch S6. When switch S6 has a wiper arm S6–1, this switch S6 is grounded. This wiper arm runs in synchronism with the card transport through the code reading area and the designation of terminal 37 has been selected to indicate that wiper arm S6–1 connects ground potential to the terminal at the very moment the contact fingers S7–1 through S7–6 scan the information recorded in six rows of the 37th column of the card which is being read. Actually, this switch S6 is physically combined with the abovementioned end-column switch S26 which responds when about the end of a card passes under the contact fingers S7–1 to S7–6. (See FIGURE 3.) Ground potential is applied to one side of each of the relays K10 through K19 only if the wiper arm S6–1 of switch S6 engages contact 37 thereof, and when the translator relays furnish a signal representative of the decimal number recorded in the 37th card column.

Switch S6 is shown to have six additional contacts denoted with reference numerals 25, 32, 33, 34, 35 and 36. The contacts 32 to 36 individually pertain to stages S, T, U, V and W for exactly the same purpose. That is to say, when the wiper arm S6–1 of switch S6 engages contact 36, ground potential is being applied to a corresponding set of ten digital display control relays of stage S (K20 to K29); when the wiper arm of switch S6 engages contact 35, ground potential is being applied to a corresponding set of ten additional relays of stage T (K30 to K39). Relays K40 to K49 of stage U, relays K50 to K59 of stage V, and relays K60 to K69 of stage W are respectively enabled when arm S6–1 engages contacts 34, 33 and 32. It will thus be appreciated that the wiper arm S6–1 of switch S6 successively enables the stages R, S, T, U, V and W when the contact fingers S7–1 through S7–6 successively pass over the 32nd, 33rd, 34th, 35th, 36th and 37th column of the punched card as it passes through the reading stage period.

It should be observed that the card may pass through such stage in any direction and the columns can be scanned in any order. It will be appreciated that any particular mode of card reading depends on how the punched cards are being stacked in the hopper and the circuit network is, of course, operable by scanning a card either in a backward or a forward direction. Since each display control unit is independent, it is immaterial when one particular unit is energized in relation to the other display units. Furthermore, photographing is had only after all units have responded.

Each of the relays K10 through K19 is provided with an energizing coil respectively connected in series directly with the aforementioned diodes CR4–35 through CR4–44.

For any one decimal number read out of card column 37 by means of the reading head and to be displayed visibly in the associated code display arrangement, only one of the relays K10 through K19 is to be energized. In particular, if the decimal number to be displayed is 0, K10 will be energized. If the decimal number to be displayed is 1, K11 will be energized, etc., so that the decimal number 9 read out and to be displayed will cause relay K19 to be energized. For controlling such display beyond the period of time of initial relay energization, each relay has a holding coil connected with one end to a terminal or contact 1 of a relay K85. The respective other side of each holding coil is connected to a contact 3 of such relay normally disengaged from a blade but actuated by the respectively energized relay coil. Accordingly, each relay will be energized through that coil connected in series with the aforementioned diodes CR4–35 to CR4–44, whereas each relay remains energized through a connection of the contacts 1 and 3 of such relay, thereby connecting the holding coil of such relay to ground whenever the associated energizing coil is being energized. For example, assuming that display control relay K16 becomes energized, this initial energization lasts only for the period of time during which arm S6–1 connects contact 36 to ground. The energizing current for relay K16 thus is developed as follows: Looking at the chart of FIGURE 4, one can see that a decimal "6" is encoded by a bit in the fourth and the sixth row of a card, thus contact fingers S7–4 and S7–6 respectively apply energizing potential to translator relays K4 and K6. Accordingly, contacts 2 and 3 of relay K6 interconnect, so do contacts 4 and 5 of relay K4, thereby applying the voltage in line Z to line "6" and relay K16 responds accordingly, provided the 37th column is then being scanned. The energizing current for relay K16 thus flows from line Z, contacts 2–3 of relay K6, contacts 5–4 of relay K4, line "6" (FIGURE 13), energizing coil of relay K16, diode CR4–41, contact 37, arm S6–1 to ground. Relay K16 responds and establishes a circuit for its holding coil as follows: Line Z contacts 1–2 of relay K85 to holding coil, and the other side thereof runs over contacts 3–2 of relay K10, contact 1–2 of relay K15 (unenergized) to ground.

The current through the energizing coils of any relay K10 through K19 flows only as long as the respectively connected decimal number line is connected through one or two of the translator relays to the line of positive potential Z. Each of the relays K10 through K19 remains energized as long as contact 1 of relay K85 is connected to contact 2 which in turn is also connected to the aforementioned line Z. Accordingly, relay K85 serves as an erasing relay to be energized whenever any signal storage in any of the stages R through W is to be canceled. It will be observed that the contact 1 of relay K85 provides for a common connection to all of the stages R through W. The operation of relay K85 will be described hereinafter.

A diode CR4–34 is connected between contact 1 of relay K85 and ground and at a polarity so that it will be biased in reverse direction. Diode CR4–34 serves to suppress arcing across any of the contacts governed by the relays K10 through K19 and the corresponding relays in the other stages. Relay K85 will be energized whenever the wiper arm S6–1 of switch S6 engages a contact associated with the passage of the 25th column of the card through the scanning and reading area and under the reading fingers S7–1 through S7–6 thereof. Accordingly, any content stored previously in the display stages R, S, T, U, V and W will be erased shortly before new data are stored therein, i.e., one card causes full erasing of previously stored digits, and then the same card triggers the display of new digits as stored in particular columns.

Each one of the relays K10 through K19 controls illumination and extinction of a plurality of altogether nineteen lamps. Thirteen lamps thereof are denoted with character references A, B, C, etc., through N, and they are positioned to permit legible digit display. These lamps are all connected with one side to a suitable source of AC potential. This potential is drawn from the input transformer T1 (FIG. 12) via an adjusting transformer T11 feeding its reduced potential to a line P which is continued in FIGURE 13. The respective other side of each lamp is connectible to ground through resistors R74–1 through R74–13 and selected contact connections established by relays K10 through K19. If one traces the lamp connections in FIGURE 13, one will find that normally all nineteen lamps are connected to the voltage supply source, that is to say, in case none of the relays K10 through K19 is energized, all lamps will light. The lamps A through N are arranged in a pattern to form an "8." Therefore, normally all lamps of each stage display an "8." Accordingly, whenever relay K18 is energized, all lamps A through N will light, so that, in fact, none of the operating contacts of relay K18 can be found in any of the control circuits for the lamps A through N.

Looking at the code display arrangement one will find that the display of a zero requires all but lamp G to light. Thus, looking at the circuit diagram one will find that lamp G is connected in series with contacts governed by relay K10. Upon energization of relay K10 the contacts 2 and 3 thereof are interconnected to establish a holding circuit and concurrently therewith the connection between the contacts 1 and 2 of relay K10 are being interrupted so that lamp G extinguishes. Otherwise, relay K10 does not influence any of the other lamps A through F and H through N.

The character display code is being illustrated in FIGURE 15 and one can find easily which lamps are on (L) and which lamps are off (O) for the display of any particular decimal number. The operating blades for the relays K10 through K19 are interconnected in such a manner to reproduce this character code.

Illustratively, the decimal number "5" requires for display that all but lamps E and J be in the "on" state. Display of a 5 is signaled by energization of relay K15. As can be seen from the drawing, energization of relay K15 disconnects contacts 1 and 2 thereof and interconnects contacts 2 and 3 thereof, whereby a holding circuit for relay K15 is established. Also, contacts 4 and 5 of relay K15 are disconnected upon energization of relay K15. Thus, the energizing circuits for lamps E and J are being interrupted, and these lamps are placed in the "off" state.

These contacts as described thus far do not exhaust the functions of relays K10 through K19. The code display arrangement also illustrates that each of the decimal numbers is to be displayed in the so-called excess-3 code. Accordingly, there are provided lamps denoted with reference numbers L1, L2, L4 and L8 and governed by additional contacts pertaining to relays K10 to K19. The code chart in FIGURE 15 also shows which lamps L1, L2, L4, L8 are on and off for a particular digit.

It will be observed from the chart in FIGURE 15 that there are several lamps which will always in the "on" state because they are required for each and every decimal digit to be displayed. These are lamps C, H and N. Accordingly, these lamps are directly connected to ground with no operating contacts interposed for extinguishing same. The same holds true for two additional lamps called T1 and T2 and which are in the "on" state for as long as the main power supply switch is in the "on" state.

The junction between any of the lamps A through N, L1 through L8 and T1 and T2, one the other hand, and, respectively, resistors R74–1 through R74–19 on the other hand, are connected to anodes of a plurality of diodes denoted with reference characters CR1–33 through CR1–51, respectively. These diodes together with diodes CR1–52, CR1–53 and CR1–54 are interconnected to form a nineteen-input type "or" gate. Diodes CR1–55, CR1–56 and CR1–57 further combine the "or" gates of the stages R though W to constitute a common output connected to the display error-indicating relay K76. The other side of this relay K76 is connected to a potentiometer R84–1 for the supply of a suitable biasing voltage. Relay K76 is thus governed by a one hundred fourteen-input type "or" gate. The voltage applied to relay K76 is being drawn from line P which is the same voltage applied to the display lamps. Since AC is applied to line AC with ground as zero reference, a diode C24–45 together with potentiometer R84–1 balance the potential applied to relay K76 to zero when all lamps to which potential is applied light properly.

The "or" gate as aforedescribed is of the type furnishing a signal for energizing relay K76 whenever any of the lamps is in the "off" state while energizing potential is actually being applied thereto. In such a case, the respective series resistor for such a burnt-out lamp applies a higher than normal potential to the anode of the respectively connected diode, and the "or" gate thus feeds an energizing potential to relay K76. The "or" gate does not respond whenever the energizing circuit for any of the lamps is being interrupted by virtue of the control action exerted upon the display device by any of the relays K10 through K19. However, if at any particular state of the operation a particular lamp receives positive energizing potential through the resistor respectively connected in series thereto, but does not light, such a potential is then being applied through one input terminal of the "or" gate and positive potential is applied thereby to display error-indicating relay K76. The relay K76 will then respond and its contacts 1 and 2 (lower portion of FIGURE 12) will be interrupted whereby any further photographing action is being prevented. This will be described below. Upon energization of relay K76 its contacts 2 and 3 are interconnected and the display error lamp DS1 in the front panel will light, thereby indicating to the operator that a display lamp has burned out or is loose and that, in fact, the desired and required display is not present.

FIGURE 13 further shows relay K7 connected in series with a diode CR4–50 having its cathode connected to the terminal 37 of switch S6, while the other side of relay K7 connects to line Z. Energization of this relay K7 always takes place when the 37th column of a card is being read out, and when none of the relays K10 to K19 responds.

This situation arises if there is no bit in the 37th column. In order to insure that this will not result in the display of an "8," the relay K7 connects line Z to line "0" (see FIGURE 12, upper righthand corner). One can see that this is possible only when, in fact, none of the relays K1 to K6 has responded (see contacts 11 and 12 of relays K2 to K6). A zero will thus be displayed either when no translater or relay has responded or when relay K1 has responded (see the chart of FIGURE 14).

Thus far the display network has been described with reference to operational modes in which cards are being read out and the result of the read-out of specific columns is being displayed. In the following it shall be described that the same display device can be used together with the keyboard 111 (FIGURE 2) to manually store and legibly display any decimal digit. To achieve this purpose, there are provided ten switches denoted with character references SB–0 through S8–9. They are operating in parallel and they are connected with one side to a line which is governed by the blade mode 3C of mode switch S5. The respective other side of each of the switches S8–0 through S8–9 leads to the junction of energizing coils of relays K10 through K19, respectively, and diodes CR4–35 through CR4–44, respectively. Accordingly, these switches S8–0 through S8–9 (via switch S5—mode 3c) serve to apply directly ground potential to the energizing coils of relays K10 through K19, respectively. Thus, upon depressing any one of these switches S8–0 to S8–9 and pertaining to the manually operated keyboard 111, the respective relay K10 through K19 will be energized.

To insure continued energization of the selected relay there are provided altogether ten diodes denoted with character references CR4–24 through CR4–33. They are respectively connected with their cathodes to the energizing coils K10 through K19, respectively, and the anodes of these diodes CR4–24 through CR4–33 are interconnected and they lead to the line Y which is governed by mode switch blade 3a, so that positive potential is being applied to the line Y during mode 3 (manual) operation.

The holding coils of relays K10 through K19 do not participate in mode 3 operation because no positive potential is applied to line Z, so that the keyboard switches S8–0 through S8–9 whenever actuated must lock in their respective positions. No erasing is required for this mode of operation because any manual release of any of the keyboard switches S8–0 through S8–9 results in the de-energization of the correspondingly governed relay selected from the group including relays K10 through K19.

For purposes of completion only, it should be mentioned that in order to avoid multiplicity of contacts of mode switch 3 there is provided an additional relay K86 (FIGURE 12) connected to supply voltage upon actuation of mode switch 3a also, the separation of the context of relay K86 and of the mode 3 switching contacts prevents a hidden path situation from developing in the manual mode. This relay K86 has contacts connecting the one keyboard line for each of the stages T, U, V and W to ground so that these stages can also be manually loaded with a decimal number to be displayed for purposes of photographing the same. Stage S is itself governed by a mode switch 3d. It is pointed out that this distinction serves only to avoid too many contacts for that one mode switch 3.

It will be appreciated that the number of stages R through W, which in the present case is six, is not critically limited and any number of such stages and any number of positions for decimal numbers to be displayed can be selected. It is necessary only that the cards to be evaluated by this apparatus have appropriately selected columns which contain the proper code signals.

*Description of the photographic control network*

There is first provided a suitable voltage source, preferably the mains, governed by a main power switch S4. The same voltage source supplies power to the transformer T1, supra. In between the voltage terminals there is first connected a time clock motor M1, a vacuum motor B1, a card reader drive B3 and the photographic motor shutter B2. Whenever the main power switch S4 is being closed these four motors run continuously. The motors B1, B2 and B3 are rendered effective by way of suitable clutches and solenoids to be described below.

A voltage stabilizing network is provided which includes several resistors, diodes and Zener diodes in order to stabilize the voltage applied to the circuit elements to be described hereinafter. The card ready switch S17 is positioned in the path of the punched card, as stated, when it is being transported from the code reading stage into the first document area. The card ready switch is in a deactivated state whenever there is no card present and again whenever a card is in the proper photographing position in the first document area. The card control relay K73 is connectible to the voltage source through the activated card ready switch S17.

The electromagnetically operated clutch or solenoid L8 is provided in the camera head for connecting the shutter motor B2 to the shutter disk 150 in the photographic head, as was described above. This shutter clutch L8 is connected in parallel to the exposure indicating lamp DS4 and a vacuum solenoid L9. The latter solenoid serves to pump out the vacuum chamber 143 (FIGURE 8) by furnishing the proper connection to the vacuum motor B1.

These three circuit elements L8, L9 and DS4 can be connected to the voltage source either through a blade of an energized exposure control relay K75 interconnecting contacts 8 and 9 thereof, or through the card ready switch S7 when in deactivated position and then either through blade A or deactivated exposure control switch S2 or the blade A of mode switch 1. An alternative connection to the elements L8, L9 and DS4 can be provided through shutter position switch S20 when in its activated state. Whenever the shutter position switch S20 is deactivated, it provides a connection to a holding blade of master control relay K73 interconnecting contacts 2 and 3 thereof. Concurrently, deactivated shutter position switch S20 governs a holding circuit for relay K75 established by interconnected contacts 5 and 6 thereof.

Relay K75 is the exposure control relay and is connected to operating potential either through the aforementioned holding blade and the shutter position switch S20 or through the following elements: There is provided a frame counter switch S22 which is in the deactivated position for as long as there is film available for exposure in magazine 108 (FIGURE 6), but which switch S22 is being deactivated when there is no more film available for that purpose. The connecting circuit for the coil of relay K75 further includes interconnected contacts 1 and 2 pertaining to the display error control relay K76, which was described above with reference to FIGURE 13, and indicating that the display device is in proper operating condition. In case of display error and response of relay K76, its contacts 1 and 2 are disconnected to interrupt the energizing circuit for relay K75. In series with these two aforementioned switching devices there is connected the film position switch S21. This film position switch S21 is deactivated as long as the film in the photographing head is in a proper position for purposes of photographing. The film position switch S21 is in its activated and alternative operating position whenever the film is being transported from one frame position to the next one. Thus, during film transport, exposure control relay K75 cannot be energized.

In this alternative position the film position switch S21 applies instead potential to the film advance motor B4 and to a counter control relay K72 having blades to interconnect contacts 5 and 6 thereof for connecting a frame counter to the voltage source. The frame counter in turn operates the frame counter switch S22. The lamp DS3 signals film and counter advance.

Provided switches S21 and S22 are in the illustrated position, and provided further that relay K76 is deenergized, relay K75 can be energized through either one of the following two current paths. Exposure control relay K75 may receive energizing potential through interconnected contacts 1 and 2 of a film advance relay K74 when deenergized. Alternatively, relay K75 may be energized through interconnected contacts 5 and 6 of frame control relay K9 to be described below.

Finally, for energizing exposure control relay K75, it is necessary that master control relay K73 has been energized and has established a connection between contacts 5 and 6 thereof. Alternatively, exposure control relay K75 can be energized when blade C of mode switch 1 is not activated and when exposure control switch S2b is being depressed.

The aforementioned film advance control relay K74 receives potential through interconnected contacts 2 and 3 of relay K75 when energized. A transfer relay K81 is provided to be energized through interconnected contacts 8 and 9 of the energized frame control relay K9 as long as a relay K80 remains deenergized, or through its own holding circuit, interconnected contacts 2 and 3 of relay K81. The contacts 4 and 5 of the unenergized transfer relay K81 connect the coil of relay K80 to one pole of document switch S24.

There is next provided a card drop control relay K83 energized through interconnected contacts 9 and 8 of energized master control relay K73, or through its own holding blade, or through interconnected contacts 2 and 3 of an energized delay control relay K87. Energization of relay K83 other than through energized relay K87 requires also that display error relay K76 is not energized and that switches S21 and S22 are both deactivated. For operating relay K83 through delay relay K87, reference is made again to counter control relay K72. The contacts 8 and 9 of counter control relay K72 also govern the connection of voltage potential during mode 1 and mode 2 operations to a contact 12 of card drop control relay K83. There is provided a capacitor C28-2 in delay relay K87, briefly mentioned above, serving as a delay network thereof. The capacitor C28-2 can be connected to a voltage source either through contacts 11 and 12 of relay K83 and contacts 8 and 9 of relay K72, or this capacitor C28-2 can be connected through the contacts 10 and 11 of the de-energized relay K83 to a parallel discharge resistor R34-15. Upon establishing this latter connection, the capacitor C28-2 will be discharged.

Whenever capacitor C28-2 is connected to the voltage source it furnishes an energizing current for the series-connected coil of relay K87 which will remain energized for about 400 milliseconds. Accordingly, the contact blades of delay relay K87 when energized establish an energizing circuit for relay K83 for the duration of the energization of relay K87 which is about 400 milliseconds. Since the relay K83 governs the voltage supply to the solenoid of the card drop solenoid L3, this relay K87 assures that there is sufficient time for the card drop solenoid L3 to respond whenever activation thereof is initiated by an energization of relay K83, and independent from the holding circuit of relay K83.

The card drop control relay K83, furthermore, has two principal operating contact blades which may cooperate with the document switch S24. The document switch S24 has two operating positions, one called the "single" position and the other called the "double" position. The drawing illustrates the document switch S24 in the "single" position. The blade B of mode switch 1 is connected for either applying voltage to the film advance motor B4 without employing the circuit network established through the document switch S24, or, when deactivated, mode switch 1 permits effective insertion of the document switch S24 into the circuit network governing film advance motor B4. The mode switches 1 and 2 establish an energizing circuit for the film advance motor through the document switch S4 when in "single" position or, when the mode switch 2 is depressed its blade C applies voltage potential to the film advance motor through the then interconnected contacts 5 and 6 of the energized relay K83 or through the interconnected contacts 4 and 5 of the unenergized relay K83.

The card drop solenoid L3 is connected to operate concurrently with the film advance motor B4 provided relay K83 is energized to interconnect its contacts 8 and 9. Alternatively, the card drop solenoid L3 can be connected to the voltage source also through a limit switch S23 activated by the output hopper 190 (see FIGURE 3).

Operation of film advance motor B4 requires either an unactivated switch S22, an unenergized relay K76, or an activated switch S21. Alternatively, motor B4 is energized (and, in fact, started) through a deactivated switch S20, an unenergized relay K75 (interconnected controls 4 and 5) and energized relay K74. Further energization for starting depends on the mode switch actuation, 1 or 2, with or without energized relay K83, and the position of switch S24. This will be developed more fully below. In any event, energization of motor B4 through any of these circuits requires the manual advance switch S1 to be deactivated. Upon activation thereof, motor B4 is directly energized provided the position switch S20 is in its resting position, as illustrated.

The following circuit elements pertaining to the photographic control will be connected always or are connectible always to the positive pole of the rectifier R2, and their activation does not depend upon the activation or non-activation of mode switch 3B. There is first connected the framer-moving solenoid L6 which was described more fully with reference to the camera head. Connected across the framer solenoid L6 is a framer-locking relay K9. Solenoid L6 and relay K9 can be energized either through interconnected contacts 2 and 3 of a framer control relay K80 or through interconnected contacts 1 and 2 of the deenergized counter control relay K72, provided the relay K9 is being energized and interconnects its contacts 2 and 3. Accordingly, framer solenoid L6 will be energized initially upon response of the relay K80, whereas a holding circuit can be established thereafter provided the relay K72 is not energized. The framer control relay, in turn, is connectible by a blade of transfer relay K81 to the document switch S24. In particular, when switch S24 is in the "double" position, deenergized relay K81 interconnects its contacts 4 and 5 and thereby an energizing current for frame control relay K80 is provided through interconnected contacts 4 and 5 of deenergized relay K83, mode switch 2C (activated) unactivated mode switch 1B, contacts 5 and 6 of energized relay K74, contacts 4 and 5 of unenergized relay K75, and the deactivated shutter position switch S20.

*Automatic mode—photographing*

In the following it shall be described how the network automatically processes a punched card which is being transported into the first document area.

In order to initiate this mode of operation, the mode switch S5–1 has been pressed and switching blades 1A, 1B and 1C thereof have changed their position. Accordingly, the expose switch S2A is being bypassed; so is the mode switch 2C governing the document switch S24. In other words, mode switch 1B connects the film advance motor B4 into circuit with operating contacts of relays K75 and K74. Finally, mode switch 1C deactivates the exposure switch S2B.

The photographing control network, therefore, is in the following state of operative preparedness: Shutter clutch L8 and vacuum solenoid L9 are ready for operation as soon as relay K75 has responded and as soon as card ready switch S17 is in the deactivated position. Film advance motor B4 will be operated upon concurrent energization of relays K74 and K75, provided shutter switch S20 is also in the deactivated position. Relays K74, K75 and K83 are deenergized, but in a state permitting them to respond as soon as master control relay K73 is being energized. Frame counter switch S22 is in the deactivated state because it is being assumed that exposable film is still available. Film position switch S21 is also in the deactivated state because it is assumed that the previous film advance has been completed. Relay K76 is deactivated because it is assumed that all lamps are in operative condition.

It shall be assumed that automatic operation is already in progress and that a card enters the reading station. In this situation relay K79 is energized; so is solenoid L7. When column 25 passes under the scanning fingers, the switch S6 running in synchronism with the passage of the card through the reading station engages contact 25 (see FIGURE 13) and relay K85 responds, interrupting its contact connection 1–2. Accordingly, all relays K10 to K69 deenergize. Next, the code columns will pass under the reading station and contact fingers S7–1 to S706 will read the code, serial by column, parallel by bit. Each card column will cause a translator relay or pair of translator relays (K1 to K6) to respond and six signals will be furnished sequentially by the decoder output lines "0" to "9". The six signals may be different or similar and they are sequentially fed to re-encoder display control stages R, S, T, U, V, W and correspondingly selected ones of relays K10 to K69 will respond. The response is triggered by the switch S6 sequentially enabling these stages. Thereafter, the display area 112 shows the scanned code as illuminated decimal numbers as well as in the binary code.

As soon as the card begins to enter the first document area I, card ready switch S17 is being actuated and alternates its position. Accordingly, potential is applied to master control relay K73, which relay responds and thereby establishes the following connections: First of all, relay K73 holds over its own interconnected contacts 2 and 3 through the deactivated shutter position switch S20. Relay K73 also interrupts the connections between contacts 10 and 11 governing relay K79 of the card feeding mechanism.

Relay K75 receives energizing potential through interconnected contacts 5 and 6 of relay K73, the interconnected contacts 1 and 2 of the deenergized relay K74, the deactivated film position switch S21, interconnected contacts 1 and 2 of the deactivated relay K76, and the deactivated frame counter switch S22. The card drop control relay K83 receives energizing potential through contacts 8 and 9 of relay K73, and switches S21, S22 and contacts 1 and 2 of relay K76.

Exposure control relay K75 perfects the following circuits. It first establishes a holding circuit through contacts 5 and 6 connected in series with deactivated shutter position switch S20. Interconnected contacts 2 and 3 of activated relay K75 apply voltage to film advance control relay K74. Contacts 8 and 9 of exposure control relay K75 further connect in circuit to shutter clutch solenoid L8, vacuum solenoid L9 and exposure lamp DS4, but an energization circuit for these latter three circuit elements can be completed only after card ready switch S17 has returned to its deactivated state.

Relay K74 interrupts the initial energizing circuit for exposure control relay K75 by interconnecting contacts 2 and 3 of relay K74. Of course, relay K75 now holds over its own circuit, as stated. Contacts 5 and 6 of film advance relay K74 are being interconnected as a first step to prepare control of an energizing circuit for the film advance motor B4. Since contacts 5 and 6 of relay K75 are still interconnected, the film advance motor will not yet start.

At this state the photographing network is ready for photographing operation. As soon as the punched card is in its proper place in document area I, card ready switch S17 deactivates whereby energizing circuits are established for shutter clutch L8, vacuum solenoid L9, and exposure-indicating lamp DS4. Deactivation of card ready switch S1 further interrupts the initial energizing circuit for master control relay K73; however, relay K73 still holds over its own contacts 2 and 3 and the deactivated shutter switch S20. Vacuum solenoid L9 operates as aforedescribed and establishes vacuum in chamber 143 (FIGURE 8) to flatten the film, and shutter clutch L8 connects the shutter motor B2 to the shutter disk and concurrently the exposure lamp lights up so that the picture of the punched card in document area I, together with the display code, will now be taken.

Advancing of the shutter disk soon causes activation of shutter position switch S20, whereby the holding circuits for master control relay K73 as well as for expose control relay K75 are being interrupted. Relays K73 and K75 deenergize. Both have fulfilled their functions up to this point. However, film advance control relay K74 and card dropping relay K83 still hold through their own contacts.

The alternation in position of shuttter position switch S30 now applies directly potential to elements L8, L9 and DS4 so that the deenergization of exposure control relay K75 has no effect upon the operation of these three "photographing" elements. The completion of the taking of the picture is signaled by a return of shutter position switch S20 to its deactivated state. Thereby the energizing circuits for elements L8, L9 and DS4 are being interrupted.

However, the return of switch S20 to its deactivated state now establishes an energizing circuit for film advance motor B4. This energizing circuit for motor B4 runs through the deactivated shutter position switch S20, newly interconnected contacts 4 and 5 of the deactivated relay K75, contacts 5 and 6 of the activated relay K74, mode switch 1B, and the deactivated manual film advance switch S1. The energized relay K83 has its contacts 7 and 8 interconnected previously, i.e., prior to the shutter operation, so that a return of shutter position switch S20 also applies voltage to the card drop solenoid L3. The card which had just been photographed is now being dropped into the output hopper 190.

In addition to the starting of the motor B4 and to the energization of card drop solenoid L3, counter relay K72 responds concurrently thereto to advance the frame counter by one step.

As soon as shutter switch S20 has returned, the film advance motor B4 starts to run, and film position switch S21 shifts its position into an activated state whereby the holding circuits for film advance control relay K74 and card drop control relay K83 are being interrupted. In its now activated position, film position switch S21 establishes a holding circuit for film advance motor B4, card drop solenoid L3 and counter relay K72, so that deactivation of advance control relay K74 and disconnection of its contacts 5 and 6 have no effect on the continuation of operation of elements B4, L3 and K72. As soon as the film has been advanced by one frame, film position switch S21 returns into its deactivated state whereby motor B4 is being stopped. The card drop solenoid L3 may not have completed its operation during the period of time it takes to advance the film by one frame. Accordingly, solenoid L3 should not be deactivated when motor B4 stops. In order to insure sufficient time for card drop solenoid L3, its control relay K83 is connectible to the voltage source through contacts 2 and 3 of the relay K87. Relay K87 was connected to voltage through interconnected contacts 11 and 12 of relay K83 and interconnected contacts 8 and 9 of relay K72 as soon as both relays K72 and K83 were energized. The capacitor C28-2 is connected in series to relay K87 so that the relay K87 will be energized for as long as the capacitor draws current for charge. Relay K87 will deenergize when the capacitor is charged. The time constant of this capacitor is selected to keep relay K87 energized for about 400 millimicrons which is sufficient time to extend the energization of relay K83 beyond the interruption of the holding circuit by film position switch S21.

As will be recalled and as can be seen from the drawing, relay K87 requires for response interconnection of contacts 8 and 9 of counter control relay K72, and this relay K72 is connected in parallel to the film advance motor B4, so that relay K72 is being energized as long as the film advance motor runs. Since relay K72 is required only when photographing is in progress, it can be deactivated by manual film advance switch S1 activated when film is being reeled. Soon after motor B4 has started to run, film position switch S21 will return to its deactivated position which is the penultimate step for the return of the photographing control network to its initial state of mode 1 preparedness. After elapse of the time constant, relay K87 will deactivate thereby opening its contacts 2 and 3 and relay K83 finally deenergizes whereby its contacts 10 and 11 interconnect to discharge the capacitor connected in series with relay K87. Since no voltages are now being applied to either the relay K87 or the capacitor, the capacitor is being discharged completely, and the relay K87 remains deenergized. The circuit is now in a state permitting another photographic cycle upon activation of card ready switch S17.

If the frame counter has advanced to indicate that no more exposable film is available, its control switch S22 is placed in its activated state whereby the establishing of an energizing circuit for exposure control relay K75 becomes impossible. Accordingly, any energization of master control relay K73 remains ineffective. The same holds true for relay K83, and since film advance control relay K74 depends on the energization of exposure control relay K75, relay K74 will likewise not respond.

The situation is similar if any of the code display lamps have burned out so that the contacts 2 and 3 of display error indicating control relay K76 are interconnected to light up display error lamp DS1. Concurrently thereto, activation of exposure control relay K75 is rendered impossible.

*Photographing—mode 2 operation*

In the semi-automatic mode photographing is carried out partially automatic, partially manual. Since the mode 2 switch is being activated for semi-automatic operation, the photographing control network is in the following state: In the mode 2 operation, switches 1A and 1C have the illustrated position so that exposure switch S2, having contacts S2A and S2B, is being rendered operative. Activated mode switch blade 2C establishes a current path for film advance motor B4 through the document switch S24. The document switch is destined for semi-automatic-mode 2 operation.

When during the semi-automatic mode a punched card enters the document area I in a manner similar to that during mode 1 operation, card ready switch S17 is activated to energize master control relay K73. Now, exposure control relay K75, film advance control relay K74, and card dropping control relay K83 are energized in succession similar to that during mode 1 operation. The photographing is carried out just as in the case of automatic operation.

The film advance motor B4 is now being energized after completion of photographing through the then deactivated shutter position switch S20, contacts 4 and 5 of the then deactivated exposure control relay K75, contacts 5 and 6 of the energized film advance control relay K74, the deactivated mode 1B switch, the activated mode 2C switch, contacts 5 and 6 of energized relay K83, and the deactivated manual film advance switch S1. At this state the energized relay K83 still circumvents the document switch S24. Now the film is being advanced, the frame counter is triggered by one step, and the punched card just photographed is being dropped in a manner similar to that outlined in connection with the mode 1 operation. However, no new photographing cycle is being activated automatically because no new punched card will enter the document area I.

It will be recalled that mode 2 operation is provided to permit photographing of the additional cards, which by themselves may not be punched cards but running under the same code number of the punched card just photographed. The code number is still displayed. It will further be recalled that the erasure of any display is carried out by the succeeding punched card when running through the reader station sensing its code. Since at the present instant, i.e., after completion of photographing of a punched card, no new punched card is being advanced during mode 2 operation, the display previously made now stays on, and the photographing circuit is ready for manual operation.

It may be assumed that the document switch S24 is in the "single" position. Now an additional card to be photographed with the still displayed code and having information on one side only, is being placed into the document area I. Thereafter exposure control switch S2 is depressed whereby contact S2A opens while contact S2B closes. Contact S2B serves to manually simulate an operation that is analogous to the function of energized relay K73, with the exception that for this manual operation no card dropping is to be initiated. Accordingly, exposure control relay K75 is energized through the closed contact S2B, the deactivated mode switch 1C, the yet interconnected contacts 1 and 2 of relay K74, and switches S21 and S22, and finally through the contacts 1 and 2 of relay K76; it still being presumed that there is sufficient film available for exposure, and that no bulb has burned out in the display device.

Again, exposure control relay K75 holds over its own contacts so that the exposure switch S2B does not have to be depressed continually. Since card ready switch S17 has retained its deactivated position, the release of exposure control switch S2 when closing contacts S2A causes the shutter clutch L8 and the vacuum solenoid L9 and the exposure lamp DS4 to be energized through contacts 7 and 8 of the activated exposure control relay K75.

Upon initiation of shutter disc movement, the shutter position switch S20 establishes the energizing circuit for elements L8, L9 and DS4 whereas relay K75 is being deenergized. Upon completion of photographing, shutter position switch S20 returns into the position indicated.

Subsequent to the energization of the exposure control relay K75, the film advance control relay K74 has been energized to interconnect its contacts 5 and 6, and it now holds through its own contacts 2 and 3. Accordingly, upon return of shutter position switch S20 to the deactivated state and after deactivation of relay K75, the following energizing circuit is being established: Deactivated shutter position switch S20, contacts 4 and 5 of relay K75, contacts 5 and 6 of relay K74, deactivated mode switch 1B, activated mode switch 2C, contacts 4 and 5 of the deenergized control relay K83, the single position document switch S24, and the deactivated manual film advance switch S1. Accordingly, the film is being advanced again by one frame while concurrently the counter control relay K72 responds. Photographing of this additional card on one side thereof is completed and the network is again in the state of mode 2 preparedness. Now either additional cards can be photographed, still on one side thereof, and with each such picture the same code display will be used. Alternatively, the card feed control switch S3 may be depressed so that a punched card will first be read, its code will be displayed and then this card will enter the document area I. Concurrent activation of card ready switch S17 initiates an automatic photographic cycle as before described.

It shall now be assumed that the document switch S24 is in the "double" position. In this case it is presumed that a punched card is accompanied by one or more additional cards which have to be photographed on both sides. The photographing of the punched card preceding the non-punched card or cards to be photographed on both sides is carried out as aforedescribed. After this punched card has been photographed together with its specific code display, the operation again starts by placing one of the supplementing cards on the document area I and by subsequently pressing the S2 exposure control switch. Again, the picture will be taken in that solenoids L8 and L9, as well as the exposure lamp DS4, are being activated first through the exposure relay K75 and later through the activated shutter position switch S20.

After the picture of one side of this card has been taken, and after shutter position switch S20 has returned to its deactivated state, no energizing circuit for film advance motor B4 is being established, but the previous current path running through the deactivated shutter position switch S20, the contacts 4 and 5 of deactivated relay K75, the contacts 5 and 6 of the energized relay K74, the non-activated mode switch 1B, the activated mode switch 2C, now continues through contacts 4 and 5 of deactivated relay K83, the double positions of switch S24, contacts 4 and 5 of yet deactivated relay K81 through the coil of frame solenoid control relay K80. It is important that this frame solenoid control relay K80 is energized at a moment when during the analogous phase of operation the film advance motor B4 would be energized. In other words, the mask or frame 136 is being shifted in lieu of advancing the film by one picture.

Energization of this control relay K80 initiates the following operational steps: At first, it energizes the framer solenoid L6 by connecting it through relay contacts 2 and 3 of control relay K80 to a positive source of potential. Concurrently thereto, frame locking control relay K9 closes its contacts 2 and 3 to thereby establish a holding circuit for itself as well as for framer solenoid L6. This holding circuit runs through the contacts 1 and 2 of presently deactivated counter relay K72. Additionally, locking relay K9 interconnects its contacts 8 and 9 as a preparatory step for energization of transfer or shifting relay K81.

As can be seen from the drawing, energization of transfer relay K81 is not possible as long as relay K80 is energized. The next step now is to place the unpunched card into document area II and with its reverse side facing the camera. Now again the exposure switch S2A-S2B is closed whereby exposure control relay K75 is energized again which energization results in the establishing of the following connections: Contacts 5 and 6 of exposure control relay K75 while establishing a holding circuit for this relay K75 also interrupt the energizing circuit for frame control relay K80. As far as the framer solenoid L8 and the framer locking relay K9 is concerned, they remain energized through the holding blade of relay K9 and the still deactivated relay K72, particularly the contacts 1 and 2 thereof. However, transfer relay K81 is now being energized through interconnected contacts 8 and 9 of relay K9, and the now deactivated frame control relay K80, particularly the contacts 4 and 5 thereof. Transfer relay K81 immediately establishes its own holding circuits through contacts 2 and 3 thereof.

The energized relay K81 now connects its contacts 5 and 6 so that relay K80 cannot be energized any more when the photographing proper of this other side of the unpunched card is being completed. Upon release of exposure control switch S2 this other side of such additional card is being photographed as before described whereby shutter switch S20 temporarily moves into its activated state thereby interrupting the holding circuit for the exposure control relay K75.

Upon completion of photographing, the shutter position switch S20 returns into its illustrated position whereby now the following circuit is established: Deactivated shutter position switch S20, contacts 4 and 5 of deactivated relay K75, contacts 5 and 6 of the still activated relay K74, the deactivated mode 1B switch, the activated mode 2C switch, contacts 4 and 5 of the deenergized relay K83, the "double" position of switch S24, contacts 5 and 6 of the energized transfer relay K81, and the manual film advance switch S1, to motor B4 and the counter with its relay K72. Upon energization of motor B4, the film is being advanced by one frame and film position switch S21 is temporarily activated to retain an energizing circuit for the film advance motor B4, thereby interrupting the holding circuit for film advance relay K74 and the holding circuit for the transfer relay 81. Contacts 4 and 5 of relay K81 govern relay K80 are disconnected and relay K80 deenergizes. Concurrently thereto the counting relay K72 is being energized to interrupt the holding circuit for locking relay K9 and the framer solenoid L6 returns into the position provided for normal photographing of document area I.

It will be understood that in the "double" position only every other picture is being counted, because the counting relay K72 responds only when film is being advanced. Accordingly, the relay K72 is effective only during the second cycle of the double document condition.

At this stage the photographing network is ready for the placement of additional cards into one of the document areas, whereby the documents switch S24 is being adjusted appropriately. Alternatively, the new punched card can be caused to enter the document area and automatic photographing and film advance cycles will be initiated.

*Photographing—mode 3 operation*

In the following, the complete manual control of the photographing process shall be described. In this case, mode 3 switch is being pressed. It will be observed that this affects the photographing control network only indirectly in that mode switches 1A, 1B, 1C and 2C are all in their inactivated state. No direct establishing of specific mode 3 circuits accompanies the pressing of mode switch 3, as far as the photographing control network is concerned.

The principal function of mode switch 3 is to deenergize or deactivate elements controlling automatic sequence of operation, to wit, blade 3B disconnects the entire card moving device from the power source, and blade 3A deactivates the scanning contacts S7 as well as the translator relays.

Mode 3 operation requires that any card to be photographed, whether a punched card or any other document, is to be placed into document area I manually. As has been described in connection with the description of the optical display system, the manual operation requires further manual operation of the display lamps.

After a card of the character described has been placed into the document I area, the exposure switch S2 is being pressed and switch S2B thereof establishes an energizing circuit for exposure control relay K75 through the deactivated mode switch 1C, contacts 1 and 2 of deactivated relay K74 and the switches S21 and S22 as well as contacts 1 and 2 of relay K76 as aforedescribed. It is important to note that even in mode 3 operation, the film advance is carried out automatically after every exposure. In other words, the depressing of exposure switch S2 initiates first the taking of the picture in a manner as before described, whereby the return of the shutter position switch S20 establishes an energizing circuit for the film advance motor through the then interconnected contacts 4 and 5 of deactivated relay K75, interconnected contacts 5 and 6 of energized relay K74, deactivated mode switches 1B and 2C, interconnected contacts 4 and 5 of the deactivated relay K83, which latter relay does not participate in any of the manual modes, switch S24 in "single" position, and deactivated manual film advance switch S1. It is important to note that the manual film advance switch S1 does not participate by way of activation during any of the modes 1, 2 or 3. This switch serves solely for advancing the film either prior to the normal operation or at the end thereof to completely remove film from the payout reel.

Also, concurrently with the film advance, the counter is being activated automatically because the counter control relay K72 is connected in parallel to the film advance motor B4 so that also during the manual mode counting is carried out automatically.

*Individual elements*

In the following the function of several principal elements shall be summarized particularly in view of the fact that many principal elements perform slightly different functions during the different types of modes.

The master control relay K73 serves to initiate automatic photographing operation when and only when a punched card enters the document area I. Relay K73 will not respond whenever any document is being photographed which has passed from the card hopper through the reading stage and into the document area I. In fact, relay K73 links the photographic process with the card feeding process to enable cyclic operation whereby a stack of cards is sequentially transported and photographed.

The exposure control relay K75 can be energized only when the frame counter is indicating that there still is available exposable film. The next condition for this relay is that none of the bulbs have burned out so that relay K76 is, in fact, deenergized. Finally, it is necessary that the film has advanced previously to a proper position so that the film position switch S21 is in its deactivated state. Exposure control relay K75 furthermore can be energized only if either film advance control relay K74 is denergized or if the frame locking relay K9 is energized. Finally, energization of exposure control relay K75 can be initiated either by energization of master control relay K73 in mode 1 operation or in the first plart of the mode 2 operation. In mode 2 operation, without a punched card being fed into the document area, exposure control relay K75 can be energized only manually through the exposure switch S2.

The exposure control relay K75 will stay energized for as long as the shutter 150 is still in the zero position. As soon as the shutter moves and shutter switch S20 is activated, the exposure control relay K75 deenergizes and is thus ready for the next exposure control step, or, in other words, once the shutter has started to move, it will require another positive step to energize exposure control relay K75 which, in turn, can be done either by another card or by manual operation during mode 2 operation.

The most important function of exposure control relay K75 is the application of voltage potential to shutter clutch L8, vacuum solenoid L9 and exposure lamp DS4. Once this trigger action is initiated by relay K75, holding circuits for these three elements are completed and retained by the shutter position switch S20. Switch S20 will cause deenergization of shutter clutch and vacuum solenoid upon completion of one particular photographic step.

The film advance relay K74 does not directly and immediately cause the film advance motor B4 to start, but the energization of relay K74 and appropriate contact connections thereof are required as a preparatory step for the initiation of such film advancing. The film advance motor B4 itself is immediately started upon return of the shutter position switch S20 into its deactivated state, i.e., after the picture has been taken.

During mode 2 operation relay K74 remains energized, even though the periods during which additional pictures are being taken. The holding circuit of film advance control relay K74 likewise requires that exposable film is still available, that the film is in proper position, and that display is had properly by appropriately selected lamps. The holding circuit for the film advance control relay K74 will interrupt immediately upon moving of the film and advancing same by one frame.

The card dropping control relay K83 is wired and interconnected in such a manner that it operates only for the purpose of causing solenoid L3 to drop a punched card into the output hopper tray 190. Accordingly, this relay K83 depends upon the energization of master control relay K73. Whenever a photograph step is being initiated by ways other than through master control relay K73, the relay K83 will not respond, and, accordingly, the card drop solenoid L3 will remain inactive during and after the photographing of cards other than punched cards.

The shutter position switch S20 on one hand serves to establish the holding circuit for those elements directly initiating and participating in the photograph operation proper. On the other hand, the shutter position switch S20 when deactivated or when returning into the deactivated state, and in cooperation with contacts 4 and 5 of the denergized exposure control relay K75 and contacts 5 and 6 of the energized film advance control relay K74 serves to provide an energizing circuit for the film advance motor B4 in mode 1 operation or in the initial step of the mode 2 operation or in the mode 3 operation; alternatively, deactivated shutter position switch S20 provides an energizing circuit for the frame control relay K 80 during "double" position step of mode 2 operation.

What is claimed is:

1. An apparatus for providing a continuous copy of a plurality of documents on a medium which is capable of varying its characteristics for providing a permanent record of signals applied thereto, comprising:
   means for reading an identifying code on said documents prior to copying thereof,
   illuminating means arranged to selectively provide and display a plurality of identifying patterns representative of codes as read from said documents,
   control means interconnecting said reading and said illuminating means for causing said illuminating means to provide a pattern in response to said identifying code as read by said reading means from said documents, and
   means for providing a copy of said illuminating means and of said documents, the code of which is being representatively displayed when said documents are in a range that permits concurrent copying of said documents and of said illuminating means.

2. An apparatus for providing a continuous copy of a plurality of encoded cards on a movable medium capable of varying its characteristics for permanent storage of signals, comprising:
   means for reading an identifying code on each of said cards prior to copying thereof,
   a plurality of sets of lamps, each set including lamps positioned to selectively provide for different illuminating patterns, each pattern representing and being legible as decimal number digits,
   means for controlling said sets of lamps in response to output signals furnished by said card-reading means upon reading a card so that said sets of lamps provide for illuminating patterns of digits representative of the code read by said code-reading means, and
   means for providing a composite copy of said lamps and of the card, the identifying code of which is being represented as illuminating pattern provided by said lamps.

3. An apparatus for providing a continuous copy of a plurality of encoded cards on a movable medium capable of varying its characteristics for permanent storage of signals, comprising:
   means for reading an identifying code on each of said cards prior to copying thereof,
   first illuminating means for providing display of legibile patterns of decimal digits representative of an identifying code as read from a card,
   second illuminating means for providing display of a contrast-producing code pattern representative of an identifying code as read from the card, and
   means for providing a composite body of said first and said second illuminating means together with said card.

4. An apparatus for providing a continuous copy of a plurality of encoded cards on a movable medium capable of varying its characteristics for permanent storage of signals, comprising:
   means for reading an identifying code on each of said cards prior to copying thereof,
   a plurality of sets of lamps, each set including lamps positioned to selectively provide for different illuminating patterns, each pattern representing and being legible as decimal number digits,
   means for controlling said sets of lamps in response to output signals furnished by said card reading means upon reading of a card so that said sets of lamps provide for illuminating patterns representative of the code read by said reading means from a card,
   means for providing a composite copy of said lamps and of the card, the identifying code of which is being represented by illuminating patterns provided by said lamps, and
   means responsive to the control state of said display lamps for blocking production of a copy by said copying means upon occurrence of a display error.

5. An apparatus for providing a continuous record of the content stored in individual record carriers, comprising:
   means for reading a code on an individual record carrier and providing a signal representative thereof,
   illuminating means for displaying said signal as a distinguishable pattern,
   a photographic camera including shutter control means and being positioned to include said illuminating means in its photographic range,
   means for positioning said individual record carrier, the code of which has been read by said code reading means, adjacent to said illuminating means and in photographic range of said camera, and
   means for actuating said shutter control means for concurrently photographing said illuminating means and said card as positioned adjacent said illuminating means.

6. An apparatus for providing a continuous copy of a plurality of encoded cards on a medium which is capable of varying its characteristics for providing a record of signals applied thereto, comprising:
   means for reading an identifying code on said cards prior to copying thereof,
   illuminating means arranged to selectively provide and display identifying patterns representative of codes as read from said card,
   control means interconnecting said reading and said illuminating means for causing said illuminating means to provide a pattern in response to said identifying code as read by said reading means from said card, and
   means for providing a copy of said card and of said illuminating means representatively displaying the identifying code when said card is in a range that permits concurrent copying of said card and of said illuminating means as juxtaposed recording on said medium.

7. An apparatus for providing a continuous copy of a plurality of documents on a storage medium capable of varying its characteristics to maintain thereon a permanent facsimile-type record of signals applied thereto, comprising:
   means for reading an identifying code on each of said records prior to copying thereof,
   illuminating means arranged for selectively providing identifying patterns representative of codes as read from at least some of said documents,
   control means interconnecting said reading and said illuminating means for setting said illuminating means to provide a pattern in response to and representative of the code as read from a document by said reading means,
   selective switching means for manually setting said illuminating means,
   means for selectively blocking effectiveness of said selective switching means and of said control means, and
   means for providing a copy of said illuminating means together with the area containing at least one document as identified by said illuminating means as set.

8. Apparatus for providing a continuous photographic record of a plurality of encoded cards, comprising:
   a photographic camera including electrical shutter control means and having a predetermined photographic range,
   means for feeding individually cards into said photographic range of said camera,
   means for reading a code stored on a card,
   decoding means connected to said reading means and providing decoded signals respectively representative of a code as read by said reading means,
   controllable optical contrast-producing display means connected to be responsive to said decoded signals for providing a visible and legible digit display pattern representative thereof and in the range of said camera, and
   means for activating said shutter control means in said camera when a card is in said photographic range.

9. Apparatus for providing a continuous photographic record of a plurality of encoded cards, comprising:
   a photographic camera including electrical shutter control means and having a predetermined photographic range,
   means for feeding individually cards into said photographic range of said camera,
   means for reading a code stored on a card during feeding and prior to the placement of said card into said photographic range,
   decoding means connected to said reading means and providing decoded signals respectively representative of said code as read by said reading means from said document,
   controllable optical contrast-producing display and storage means positioned in the range of said camera and connected to be responsive to said decoded signal for providing a visible and legible digit display pattern representative thereof, and
   means for activating said shutter control means in said camera when a card is in said photographic range.

10. An apparatus for providing a continuous copy of a plurality of encoded cards on a movable medium capable of varying its characteristics for permanent storage of signals, comprising:
   means for sequentially reading an identifying code on said cards prior to copying thereof,
   a plurality of sets of lamps, each set including lamps positioned to selectively provide for different illuminating patterns, each pattern representing and being legible as decimal number digits, means for controlling said sets of lamps in response to output signals furnished by said card-reading means upon reading a card so that said sets of lamps provide for illuminating patterns of digits representative of the code read by said code reading means, means for controlling said sets of lamps to erase therefrom previously provided patterns concurrently with passage of a card and prior to code reading thereof, and means for providing a composite copy of said lamps and of the card, the identifying code of which is being represented as illuminating pattern provided by said lamps.

11. Apparatus for providing a continuous photographic record of a plurality of encoded cards, comprising:

a photographic camera including electrical shutter control means and having a predetermined photograph range, means for reading an identifying code stored on a card, decoding means connected to said reading means providing code-identifying signals respectively representative of said identifying code, controllable optical contrast-producing display means positioned in the range of said camera and being connected to be responsive to said code-identifying signals for providing visible and legible digit display pattern representative of said identifying core, means for feeding individual cards past said reading means and into the photographic range of said camera, means responsive to the position of the card when in said range to initiate photographing thereof, and means responsive to the shutter position in said camera for terminating the initiation of photographing and controlling completion of photographing of said card and of said controllable optical contrast-producing display means.

12. In a card processing apparatus, the combination comprising:

means for reading an identifying code on a card, decoding means connected to said card reading means and providing individual output signals representative of a card as read by said reading means, re-encoding means connected to said decoding means and responsive to that output signal and providing for each output signal of said decoding means a plurality of code signals, illuminating means responsive to said code signals and providing for the copyable representation thereof, and means for providing a copy of said card together with a copy of said illuminating means as displaying a copyable representation of the code as read from said card and as decoded and re-encoded by said decoding and re-encoding means, respectively.

13. An apparatus for providing a continuous copy of a plurality of encoded cards on a medium which is capable of varying its characteristics for maintaining a record of signals applied thereto, comprising:

means for reading an identifying code on each of said cards prior to copying thereof, illuminating means arranged to selectively provide and display identifying patterns representative of codes as read from said card, control means interconnecting said reading and said illuminating means for causing said illuminating means to provide a pattern in response to said identifying code as read by said reading means from said card, means for providing a copy of said illuminating means and of an area contiguous therewith;

pre-settable means for automatically triggering said copying means when a card is in said contiguous area, and selective means overriding said automatic triggering means for manually copying said illuminating means and said area and preventing automatic triggering of said copying means.

14. An apparatus for providing a continuous copy of a plurality of encoded cards on a medium which is capable of varying its characteristics for providing a record of signals applied thereto, comprising:

means for reading an identifying code on said cards prior to copying thereof, illuminating means arranged to selectively provide and display identifying patterns representative of codes as read from said card, control means interconnecting said reading and said illuminating means for causing said illuminating means to provide a pattern in response to said identifying code as read by said reading means from said card, means for providing a copy of said illuminating means and of said card, the code of which is being representatively displayed, when said card is in a range that permits concurrent copying of said card and of said illuminating means, means for intermittently transporting said copying medium, and selector means for selectively permitting and preventing activation of said transporting means after copying of said illuminating means and of a card by said copying means onto said medium.

15. An apparatus for providing a continuous copy of a plurality of encoded cards on a storage medium capable of varying its characteristics to provide a permanent record of signals applied thereto, comprising:

code reading means for serially reading a plurality of code characters as respectively stored on said card in a plurality of columns thereof and providing output signals serially by character and parallel by bit, a plurality of sets of illuminating means, each set of illuminating means positioned to selectively provide for an illuminating pattern representing a decimal number digit, means for individually controlling said sets of illuminating means in response to said output signals as serially furnished by said card reading means upon reading of the card so as to provide in parallel illuminating patterns representative of said code characters, and means for providing a composite copy of said illuminating means and the card, the identifying code of which is being represented as illuminating pattern.

16. An apparatus for providing a continuous copy of a plurality of encoded cards on a movable medium capable of varying its characteristics for permanent storage of signals, comprising:

means for reading an identifying code on each of said cards prior to copying thereof, a plurality of sets of lamps, each set including lamps positioned to selectively provide for different illuminating patterns, each pattern representing and being legible as decimal number digits, means for controlling said sets of lamps in response to output signals furnished by said card reading means upon reading a card so that said sets of lamps provide for illuminating patterns of digits representative of the code read by said code reading means, a first and a second document area juxtaposed to said sets of lamps, and means for selectively providing a composite copy of said lamps and of one of said document areas.

17. An apparatus for providing a continuous copy of a plurality of encoded cards on a movable medium capable of varying its characteristics for permanent storage of signals, comprising:

means for reading an identifying code on each of said cards prior to copying thereof, first illuminating means for providing display of legible patterns of decimal digits representative of an identifying code as read from a card, second illuminating means for providing display of a contrast-producing code pattern representative of an identifying bit code as read from the card and along a single track, and means for providing a composite copy of said first and said second illuminating means together with said card, whereby said code track is copied on a single track on and along said medium.

18. An apparatus for providing a continuous copy of a plurality of encoded cards on a medium which is capable of varying its characteristics for providing a record of signals applied thereto, comprising:

means for reading an identifying code on each of said cards prior to copying thereof, illuminating means arranged to selectively provide and display identifying patterns representative of codes as read from said card, control means interconnecting said reading and said illuminating means for causing said illuminating means to provide a pattern in response to said identifying code as read by said reading means from said card, means for providing a copy of said illuminating means and of said card, the code of which is being representatively displayed, when said card is in a range that permits concurrent copying of said card and of said illuminating means, controllable means in said copy providing means for defining a first copying range for copying said card and said illuminating means in a predetermined spatial relationship on said medium and defining a second copying range juxtaposed to said illuminating means and excluding the range portion containing said card, meas for controlling said controllable means for selectively alternating between said first and said second ranges, means for intermitently transporting said copying medium, and selector means for selectively permitting and preventing activation of said transporting means corresponding to the operating state of said controllable means.

19. An apparatus for providing a continuous copy of a plurality of encoded cards on a medium which is capable of varying its characteristics for providing a record of signals applied thereto, comprising:

means for reading an identifying code on said cards prior to copying thereof, illuminating means arranged to selectively provide and display identifying patterns representative of codes as read from said card, control means interconnecting said reading and said illuminating means for causing said illuminating means to provide a pattern in response to said identifying code as read by said reading means from said card, means for providing a copy of said card and of said illuminating means representatively displaying the code read from said card, when said card is in a range that permits concurrent copying of said card and of said illuminating means, controllable means in said copy providing means for defining a first copying range for copying said card and said illuminating means in a predetermined spatial relationship on said medium and defining a second copying range juxtaposed to said illuminating means and excluding the range portion containing said card, and means for controlling said controllable means for selectively alternating between said first and said second ranges.

20. Apparatus for providing a continuous photographic record of a plurality of encoded cards, comprising:

a photographic camera including electrical shutter control means and film advance means and having a predetermined photographic range;

means for sequentially feeding individually cards into said photographic range of said camera;

means for reading a code stored on a card and providing signals respectively representative of codes as read by said reading means;

controllable optical contrast-producing display means connected to be responsive to said signals for providing a visible display pattern representative thereof and in the range of said camera;

means for activating said shutter control means in said camera when a card is in said photographic range; and means for activating said film advance subsequent to the activation of said shutter control means.

21. An apparatus for providing a photographic record of individual documents on a continuous film, comprising:

a photographic range area which includes two document areas and a code display area juxtaposed with the two document areas;

a photographic camera holding said film in position to photographically record images of the range area on the film, the camera further including movable masking means to selectively restrict the effective image area of the camera to one or the other of the two document areas, with the image field for one of the document areas including further the display area;

means for controlling the display as provided by the display area;

means operating in a first mode for automatically controlling the sequential feeding of documents into said one display area and for providing for synchronous camera operation for sequential photographic recordation when the masking means is in a position so that the image field includes the one document area and the display area; and means for operating the camera in a second mode to sequentially record the images of the two document areas, including means for shifting the masking means in between sequential exposures.

22. An apparatus for providing a photographic record of individual documents on a continuous film, comprising:

a photographic range area which includes two document areas and a code display area juxtaposed with the two document areas;

a photographic camera positioned to photographically record images of the range area including movable masking means to selectively restrict the effective image field of the camera to one or more of the other of the two document areas, with the image field for one of the document areas including the display area;

means for controlling the display as provided by the display area;

first control means for taking sequential exposures of said one document area together with the display area and including means for providing automatic film advance in association with each exposure;

second control means for taking sequential exposures of the two document areas, including means for shifting the masking means in between two exposures while retaining the film in position; and means for selectively operating the first and second control means.

References Cited

UNITED STATES PATENTS 3,225,649  12/1965  Timares et al. _____ 88—24

NORTON ANSHER, *Primary Examiner.*

R. A. WINTERCORN, *Assistant Examiner.*